(12) United States Patent
Sato et al.

(10) Patent No.: US 6,370,306 B1
(45) Date of Patent: Apr. 9, 2002

(54) OPTICAL WAVEGUIDE PROBE AND ITS MANUFACTURING METHOD

(75) Inventors: Kazuo Sato; Mitsuhiro Shikita, both of Nagoya; Kenji Kato, Chiba; Masataka Shinogi, Chiba; Kunio Nakajima, Chiba; Norio Chiba, Chiba; Susumu Ichihara, Chiba; Takashi Niwa, Chiba; Yasayuki Mitsuoka, Chiba; Nobuyuki Kasama, Chiba, all of (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/367,407

(22) PCT Filed: Dec. 15, 1998

(86) PCT No.: PCT/JP98/05664

§ 371 Date: Nov. 9, 1999

§ 102(e) Date: Nov. 9, 1999

(87) PCT Pub. No.: WO99/31514

PCT Pub. Date: Jun. 24, 1999

(30) Foreign Application Priority Data

Dec. 15, 1997 (JP) ................................. 9-345397
Jul. 30, 1998 (JP) ............................. 10-215780

(51) Int. Cl.[7] ................................. G02B 6/02
(52) U.S. Cl. ................. 385/129; 385/130; 385/131; 385/132; 385/14; 385/12; 385/49; 385/31; 385/32
(58) Field of Search ..................... 385/15, 14, 12, 385/27, 28, 31, 32, 33, 38, 39, 43, 49, 123, 128, 127, 129, 130, 131, 133, 147, 901, 902; 359/368

(56) References Cited

U.S. PATENT DOCUMENTS

| 4,943,129 A | * | 7/1990 | Takeda et a. | 385/43 X |
| 5,354,985 A | * | 10/1994 | Quate | 250/234 |
| 5,570,441 A | * | 10/1996 | Filas et al. | 385/43 |
| 5,664,036 A | * | 9/1997 | Islam | 385/43 X |
| 5,677,978 A | * | 10/1997 | Lewis et al. | 385/147 |

FOREIGN PATENT DOCUMENTS

| JP | 10753 A | * | 1/1993 | 385/43 X |
| JP | 147884 A | * | 6/1994 | 385/43 X |
| JP | 07174542 A | * | 7/1995 | 385/43 X |
| JP | 257814 A | * | 9/1997 | 385/43 X |
| JP | 09281123 A | * | 10/1997 | 385/43 X |
| JP | 10104244 A | * | 4/1998 | 385/43 X |
| WO | WO-99/31514 A | * | 6/1999 | 385/43 X |

* cited by examiner

*Primary Examiner*—Brian Healy
(74) *Attorney, Agent, or Firm*—Adams & Wilks

(57) ABSTRACT

The present invention has an object to obtain an optical waveguide probe which is formed in a hook form to illuminate and detect light by a manufacture using a silicon process.

This optical waveguide probe is formed in a hook form and structured by an optical waveguide 1 sharpened at a probe needle portion 5 and formed of dielectric and a substrate 2 supporting this optical waveguide 1. This optical waveguide 1 is formed overlying the substrate 2. The optical waveguide 1 is structured by a core 8 to transmit light and a cladding 9 smaller in refractive index than the core 8.

54 Claims, 28 Drawing Sheets

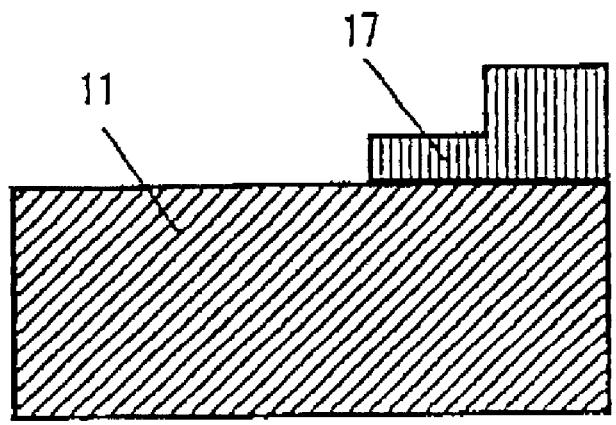
F I G. 7 A
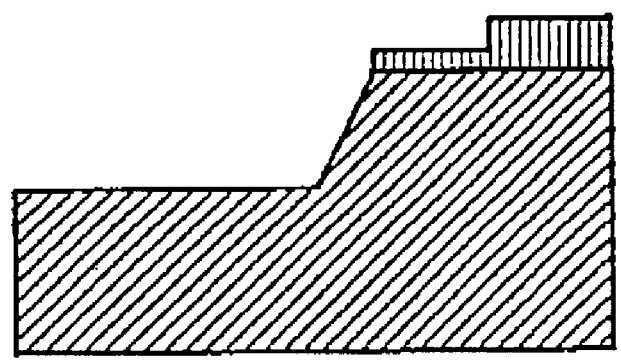
F I G. 7 B
F I G. 7 C (A)

(B)

(D)

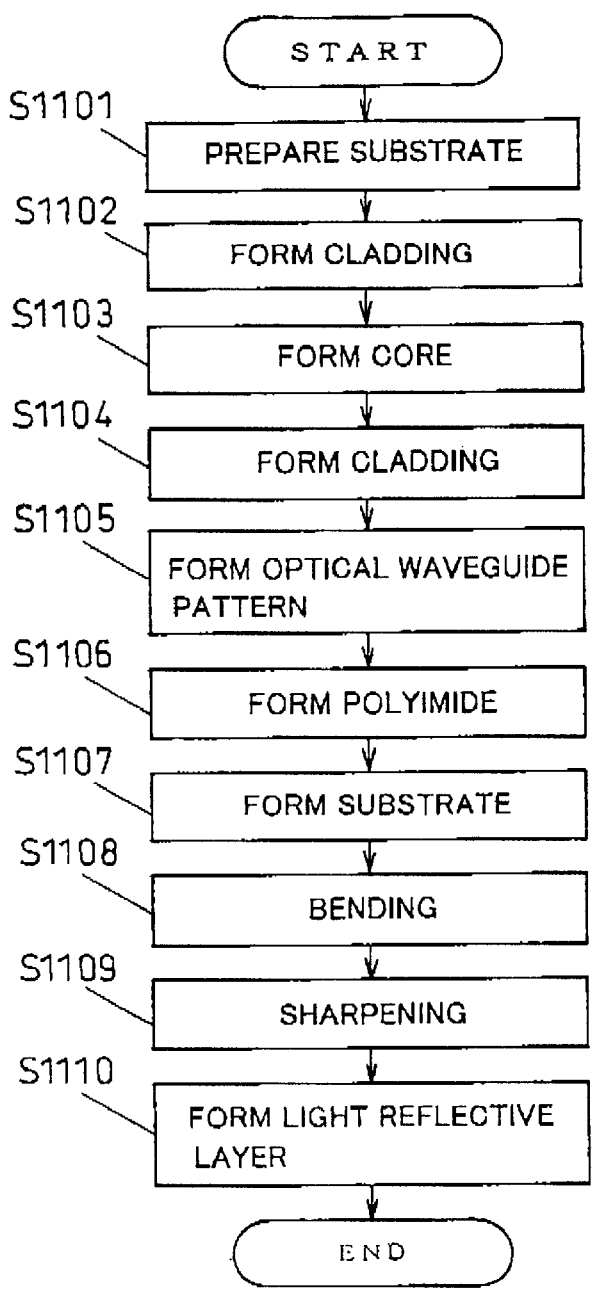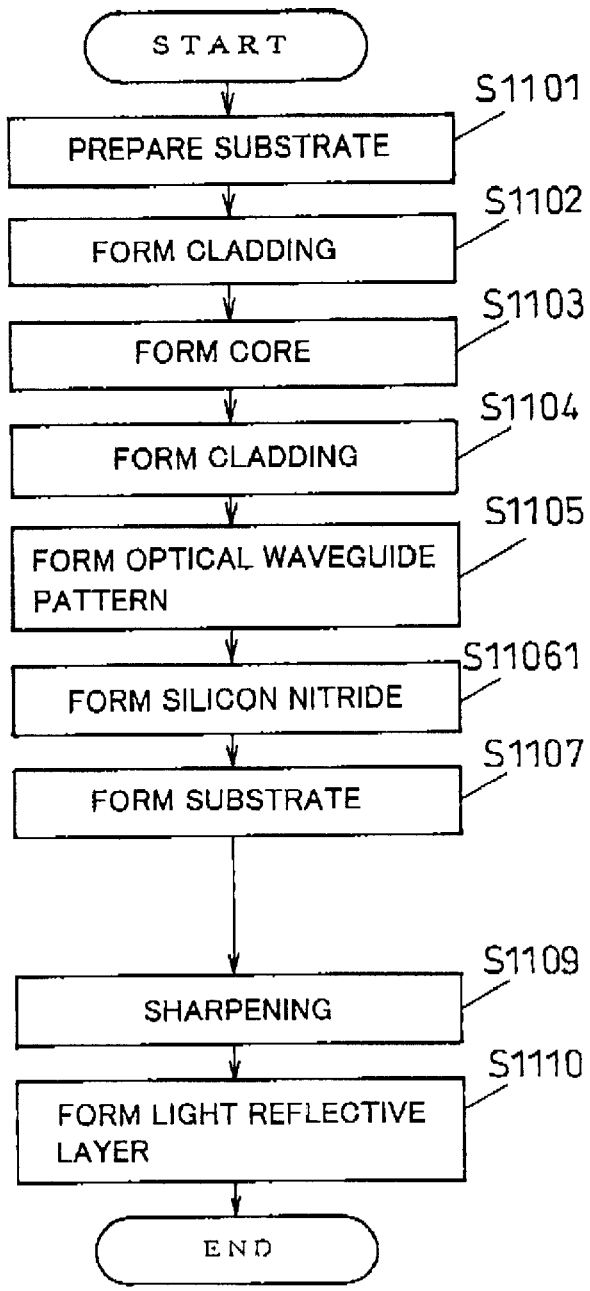

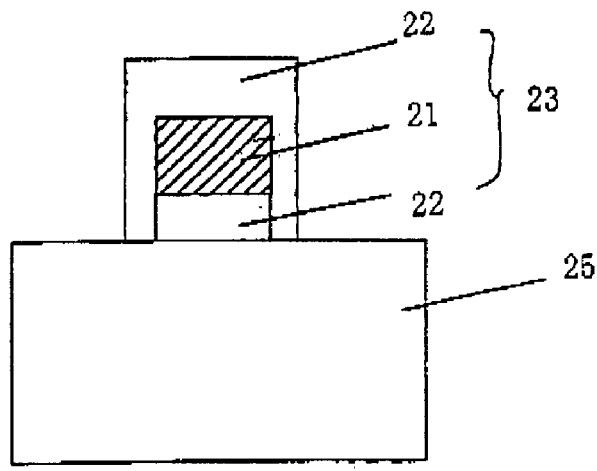
F I G. 15 A
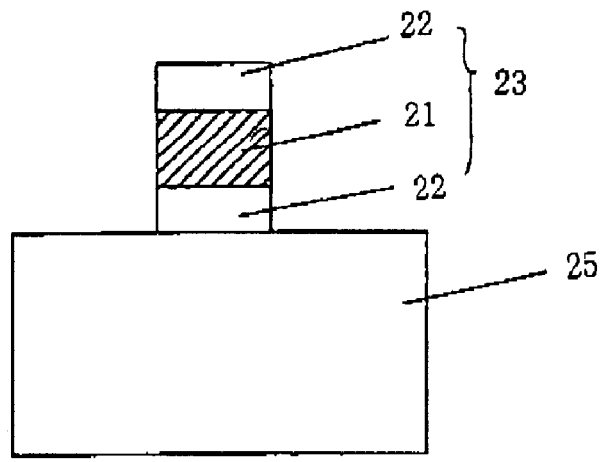
F I G. 15 B
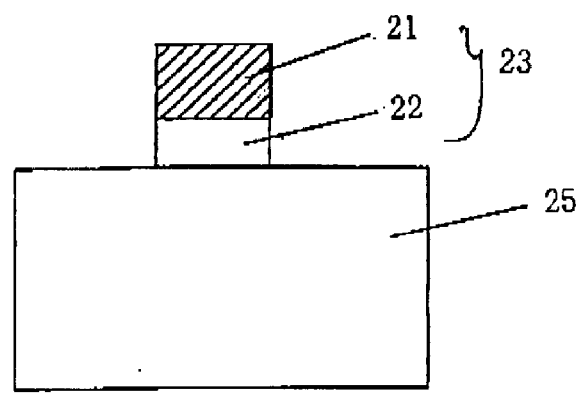
F I G. 15 C
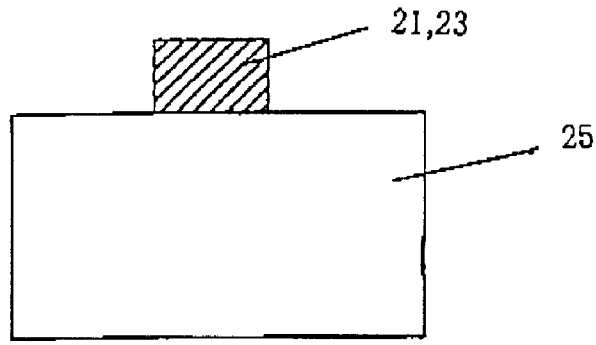
F I G. 15 D

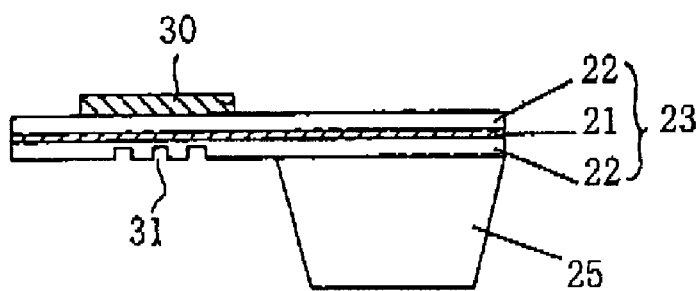
F I G. 1 8 A
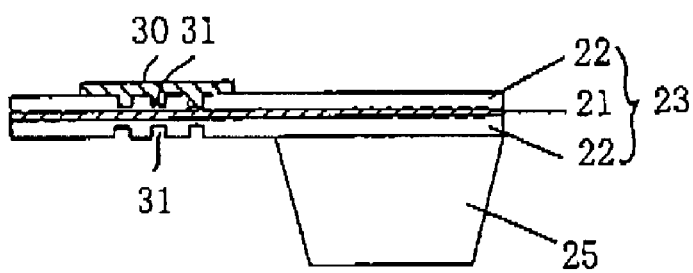
F I G. 1 8 B

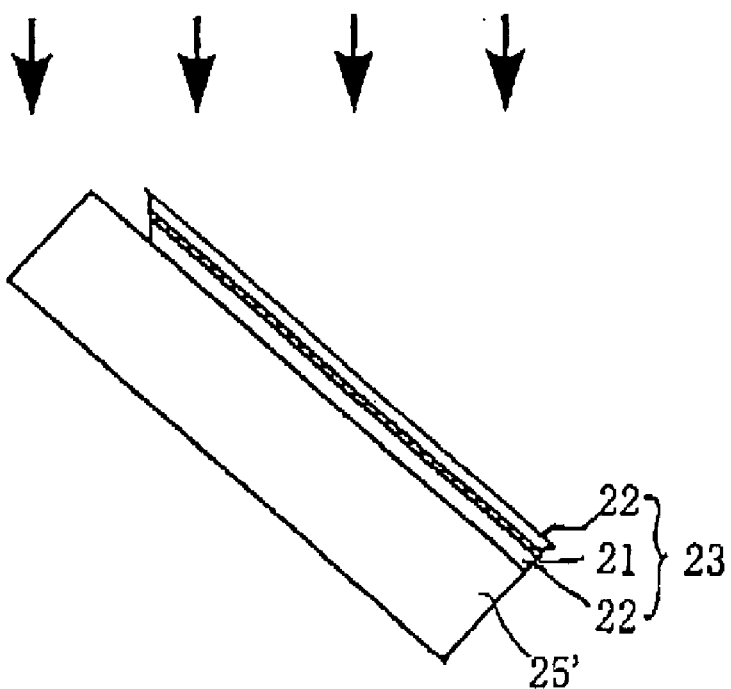
F I G. 2 2
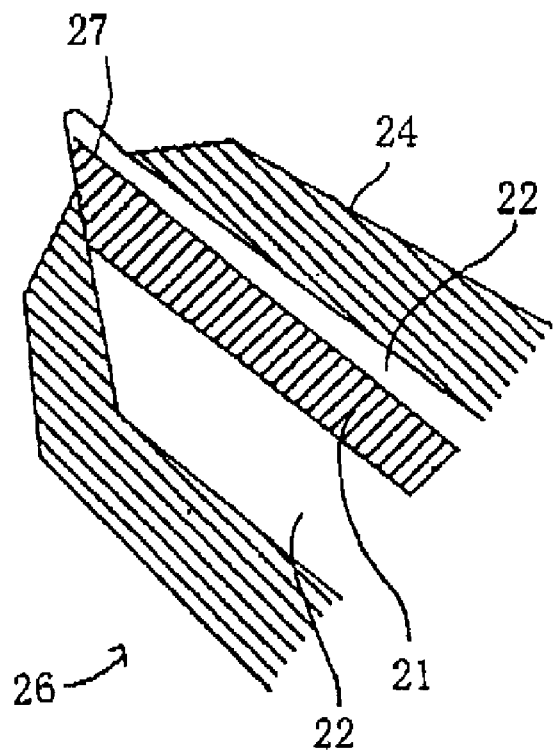
F I G. 2 3

OPTICAL WAVEGUIDE PROBE AND ITS MANUFACTURING METHOD

TECHNICAL FIELD

This invention relates to an optical waveguide probe for observing sample geometry utilizing an atomic force between substances and measuring optical property of a microscopic region of a sample through a probe formed by an optical waveguide, and to a method for manufacturing the same.

BACKGROUND OF THE INVENTION

At present, in the scanning near field optical microscopes (hereinafter abbreviated as SNOM) measurement is made of sample optical characteristics and geometry by causing a tip-sharpened probe of an optical medium to approach a measurement sample at a distance of less than light wavelength. There is proposed an apparatus, as one of such apparatuses, wherein a linear-formed optical fiber probe vertically held close to a sample at its tip is horizontally vibrated relative to a sample surface, so that a change in amplitude of vibration caused due to shear forces at the sample surface and probe tip is detected by irradiating laser light to the probe tip and detecting a change in a shadow thereof, wherein the sample is moved by a fine movement mechanism to maintain the amplitude constant whereby the spacing between the probe tip and the sample surface is kept constant to detect sample geometry and measure sample light transmission from an intensity of an input signal to the fine movement mechanism.

Also, there is proposed a scanning near field atomic force microscope which uses a hook formed optical fiber probe as a cantilever for the atomic force microscope (hereinafter abbreviated as AFM) to perform AFM actuation, and simultaneously illuminates laser light through an optical fiber probe tip onto a sample to thereby detect sample geometry and measure sample optical properties (No. 174542/1995). FIG. 34 is a structural view showing an optical waveguide probe of a conventional example. This optical waveguide is covered over its periphery by a metal film coating 102. Also, a probe needle portion 103 is sharpened, and the probe needle 103 has an aperture 104 at its tip.

On the other hand, in AFMs utilized as fine region geometrical observing means, utilized broadly are micro-cantilevers of silicon formed by a silicon fabrication process or silicon nitride.

However, there has been a problem in that the optical fiber probe used in a SNOM is manufactured in processes having many steps requiring manual operation with an optical fiber as a material so that mass producibility is low and the shapes such as tip diameter and tip angle are uneven. Also, although high speed scanning control requires an increase in resonant frequency, because the optical fiber itself is used as a cantilever spring material, the spring portion if shortened in order to increase the resonant frequency has an increased spring constant. Also, there has been the problem that the optical fiber is of a thin and long filamentous material and difficult to handle. Also, although the arrangement with a plurality of optical probes enables high speed observation without requiring high speed scanning sweep of a sample surface, the optical fiber probe is manufactured one by one by manual operation and is not suited for a structure having a plurality of probes arranged on the same substrate, i.e., an array form.

On the other hand, the micro-cantilever used in an AFM is high in resonant frequency and high in mass producibility with reduced variation, and possesses the advantages that it is even in mechanical properties such as spring constant and resonant frequency and is easy to handle. However, there has been the problem that it is impossible to conduct light illumination and light detection at the tip portion required in the SNOM.

Also, samples with large steps such as biological samples and polymer samples are considered within the SNOM application scope. However, the micro-cantilever probe needle used in the conventional AFM is as short as approximately 10 microns and it is difficult to measure a sample with large steps. Furthermore, these samples in many cases require measurement in a liquid. However, the AFM micro-cantilever is a cantilever in a plate form and accordingly it is difficult to perform measurement in a liquid.

Therefore, this invention has been made in view of the above, and it is an object to provide an optical waveguide probe which fulfills conditions of excellent mass producibility and eveness, small spring constant, ease of handling, ease of use in a liquid, capability of light illumination and detection, and capability to be arrayed with ease. Also, it is another object to provide a manufacturing method for manufacturing such an optical waveguide probe.

DISCLOSURE OF THE INVENTION

This invention is characterized in that, in an optical waveguide probe having an optical waveguide sharpened at a probe needle portion formed in a hook form and a substrate supporting the optical waveguide, the optical waveguide is characterized in that the optical waveguide is overlaid on the substrate and formed integrally therewith. The optical waveguide formed of a dielectric material is used.

Also, according to the invention, in an optical waveguide probe having an optical waveguide sharpened at a probe needle portion formed in a hook form, a substrate supporting the optical waveguide and a metal film covering the optical waveguide, the optical waveguide characterized in that the optical waveguide is overlaid on the substrate and formed integrally therewith and the probe needle portion of the optical waveguide has at a tip an aperture covered over by the metal film. The optical waveguide is formed of a dielectric. Also, the optical waveguide has a metal film deposited over a dielectric for light transmission.

On the other hand, a method for manufacturing an optical waveguide probe, comprises: a process of forming a mold for embedding the optical waveguide in a substrate, a process of depositing the optical waveguide, a process of separating the optical waveguide along the mold for embedding the optical waveguide, a process of separating the optical waveguide from the substrate.

Of the manufacturing process for an optical waveguide probe, the process of forming a mold for embedding the optical waveguide is any of an isotropic dry etching process or wet etching process using, as etching mask, photo resist having a thickness distribution having been exposed using a photo mask with a gradation, an anisotropic dry etching process using, as an etching mask, photo resist having a thickness distribution exposed using a photo mask with a gradation, an isotropic wet etching or dry etching process utilizing etching undercut to the underneath of an etching mask, a multi-staged anisotropic wet etching process to a silicon substrate using an etching mask formed stepwise with at least two steps, and an anisotropic wet etching process to a silicon substrate.

Also, the process of depositing the optical waveguide in the mold for embedding the optical waveguide is a process of depositing a dielectric material corresponding to the cladding, depositing a dielectric material relatively greater in refractive index than the cladding corresponding to the core, patterning the core, and further depositing a dielectric material corresponding to the cladding. The core patterning is conducted by photolithography using electro-deposition resist.

The process of separating the optical waveguide along the mold for embedding the optical waveguide is a polishing process for depositing a dielectric material in the mold for embedding the optical waveguide, thereafter planarizing by embedding a resin material in a recess formed in a portion of the mold for embedding the optical waveguide, and separating the optical waveguide by polishing to an original substrate surface or deeper than the original substrate surface. Also, the process of patterning the optical waveguide into a probe shape is performed, using electro-deposition resist as etching mask, by an anisotropic dry etching or wet etching process and an isotropic dry etching and wet etching process.

Th process of separating the optical waveguide probe from the substrate is a dry etching process or an anisotropic wet etching process from an opposite surface to a surface formed with the optical waveguide.

According to an optical waveguide probe as described above, it is possible to form the lever portion in a short and thin form as compared to the conventional SNOM optical fiber probe, and to improve the resonant frequency without increasing the spring constant. The optical waveguide portion formed in a hook form, if increased in length, facilitates measurement of a sample having large steps. Also, the rectangular cantilever form stabilizes vibration in a liquid as compared to the conventional AFM cantilever having a flat plate cantilever. Also, light illumination and light detection are possible to an extent that can not be achieved with the convention AFM cantilever.

Also, the use of a silicon process enhances mass producibility, improving shape reproducibility and evenness in mechanical property. Also, because the substrate and the optical wavequide portion are made in one body, handling such as mounting or adjustment is facilitated, similar to the conventional AFM cantilever.

Also, according to the above-described manufacturing method for an optical waveguide probe, the optical waveguide probe is easy to manufacture.

Next, in order to achieve the above object, an optical waveguide probe of this invention comprises a substrate serving as a support member; a columnar optical waveguide formed on the substrate and having one part thereof projecting from the substrate, and being bent toward a sample or a medium and sharpened at a tip; a light reflective layer formed over the optical waveguide except at an aperture at the optical waveguide tip. Also, the optical waveguide is structured by a combination of a cladding and a core.

Also, an optical waveguide probe of this invention comprises a substrate serving as a support member; a columnar optical waveguide formed on the substrate, and being sharpened at a tip on one side as an apex; a light reflective layer formed over the optical waveguide except at an aperture at the optical waveguide tip.

By doing so, similarly to the above, it is possible to form the lever portion in a short and thin form, and to improve the resonant frequency without increasing the spring constant. Also, where the tip of the optical waveguide is bent, it is possible to easily measure a sample having large steps. Further, the columnar shape stabilizes vibration in liquid.

Also, light illumination and light detection are possible that can not be made with the conventional AFM cantilever. Also, the use of a silicon process enhances mass producibility, improving shape reproducibility and evenness in mechanical properties.

Also, in the optical waveguide probe of this invention, a groove is formed in a portion of the optical waveguide projecting from the substrate, thereby facilitating bending. Also, a guide groove is provided in the substrate to fix a connecting position of the optical waveguide and the optical fiber, facilitating coupling with an optical fiber.

Next, in manufacturing an optical waveguide probe comprising, a substrate as a support member, a columnar optical waveguide formed on the substrate and having one part thereof projecting from the substrate, and bent toward a sample or a medium and sharpened at a tip, a light reflective layer formed over the optical waveguide except for an aperture at the optical waveguide tip, a method for manufacturing an optical waveguide probe of this invention is characterized in that the bending of the optical waveguide is made by a process of overlaying a material having a different thermal coefficient of expansion from the optical waveguide on one surface of a portion of the optical waveguide projecting from the substrate and heating the material and the optical waveguide. Otherwise, the bending of the optical waveguide is made by a process of forming a substrate for supporting the optical waveguide wherein a material having a different thermal coefficient of expansion from the optical waveguide is overlaid, while heating, on one surface of a portion of the optical waveguide projecting from the substrate.

Also, an optical waveguide is overlaid on a substrate such that one part thereof projects from said substrate, said optical waveguide at a tip is sharpened, and a light reflective layer is formed over said optical waveguide except for a tip to be formed into an aperture, wherein these processes include: a process of forming a material having a different thermal coefficient of expansion from said optical waveguide on one surface of said optical waveguide; and a process of heating said material and said optical waveguide to bend said optical waveguide. Otherwise, these processes include a process of forming while heating, a material having a different thermal coefficient of expansion from the optical waveguide on one surface of the optical waveguide.

In this manner, the use of a material having a different thermal coefficient of expansion from the optical waveguide facilitates the bending of the optical waveguide. This material may be formed over the entire surface of the one surface of the optical waveguide or a surface to be formed into a cantilever.

Also, a method for manufacturing an optical waveguide probe of this invention, characterized in that an optical waveguide is overlaid on a substrate such that one part thereof projects from the substrate, the optical waveguide at a tip is sharpened, and a light reflective layer is formed over the optical waveguide excepting a tip to be formed into an aperture, wherein these processes, wherein these processes include: a process of bending the optical waveguide by heating principally one surface of the optical waveguide.

If the optical waveguide is heated at one surface, it has increased heat absorbing amount than in the opposite surface. Due to this, the one surface is softened so that the optical waveguide is bent by the surface tension. This simplifies the bending process.

Further, in a manufacturing method for an optical waveguide probe of this invention, a groove is provided in the optical waveguide during the above process. The portion provided with the groove is reduced in moment of inertia in section, and facilitated in bending.

A method for manufacturing an optical waveguide probe of this invention, characterized in that a columnar optical waveguide is overlaid on a substrate such that one part thereof projects from the substrate, the optical waveguide at a tip being sharpened, and a light reflective layer being formed over the optical waveguide excepting a tip of the optical waveguide to be formed into an aperture. The columnar shape of the optical waveguide improves the resonant frequency without increasing the spring constant. Further, the columnar shape stabilizes vibration in a liquid. Incidentally, the sharpening for the optical waveguide uses isotropic etching, or anisotropic etching, particularly anisotropic etching in a state the substrate is inclined.

Also, in an optical waveguide probe of this invention, the optical waveguide forming an aperture is formed by three surfaces. Also, it is formed by three surfaces including at least two sets of vertical surfaces. Otherwise, an optical waveguide before the bending process is formed by a generally vertical surface and a generally horizontal surface with respect to a surface of the support substrate contacted with the optical waveguide.

Accordingly, because such a probe aperture of the optical waveguide is formed by an apex of three surfaces including two surfaces with an angle of 90 degrees, where the aperture is placed horizontally close to a sample, the bending amount in the optical waveguide can be reduced thus stabilizing manufacture and desirably improving yield. Also, the decrease in the optical waveguide bending amount reduces the light loss at the bent portion thus improving light transmission efficiency for the optical waveguide.

Also, in an optical waveguide probe of the present invention, a plurality of optical waveguides are arranged on the substrate.

Therefore, it is possible to manufacture an optical waveguide array excellent in evenness with high mass producibility and at low cost,

BRIEF DESCRIPTION OF THE DRAWINGS

FIGS. 7A, 7B and 7C are explanatory views showing a manufacturing method for an optical waveguide probe according to Embodiment 7 of the present invention;

FIGS. 11A and 11B are flowcharts showing a manufacturing process for the optical waveguide probe shown in FIG. 9;

FIGS. 15A, 15B, 15C and 15D are sectional views showing an optical waveguide probe according to Embodiment 10 of the present invention;

FIGS. 18A and 18B are explanatory views showing a modification of the optical waveguide probe of FIG. 17A, 17B and 17C;

FIG. 22 is an explanatory view showing a manufacturing process for an optical waveguide probe according to Embodiment 15 of the present invention;

FIG. 23 is a magnified view showing a tip portion of a completed cantilever 26 according to the present invention;

BEST MODE FOR CARRYING OUT THE INVENTION

Hereinafter, the present invention will be explained in detail with reference to the drawings. Incidentally, it should be considered that the invention is not intended to be limited by the embodiments.

[Embodiment 1]

Figure 1:
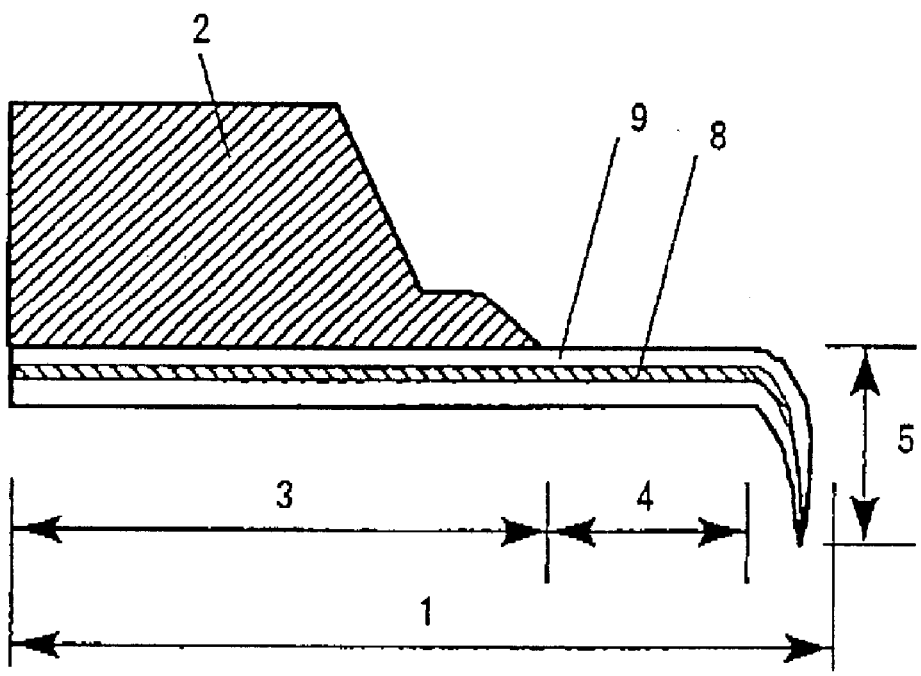
FIG. 1 is a structural view showing an optical waveguide probe according to Embodiment 1 of the present invention.

FIG. 1 is a structural view illustrating a structure of an optical waveguide probe showing Embodiment 1 of this invention. The optical waveguide probe is structured by an optical waveguide 1 and a substrate 2 supporting the same. The optical waveguide 1 is formed lying on the substrate 2 in one body therewith. The optical waveguide 1 is formed in the form of a hood, and is structured by a fixed portion 3, resilient function portion 4 and probe needle portion 5. This probe needle portion 5 is sharpened. The optical waveguide 1 is structured by a core 8 for transmitting light and a cladding 9 provided at an outer periphery thereof.

The cladding 9 has a relatively low refractive index as compared to a refractive index of the core 8. The fixed portion 3 has a length of from 50 $\mu$m to 50 mm. The resilient function portion 4 has a length of from 50 $\mu$m to 500 $\mu$m. The probe needle portion 5 has a length of from 5 $\mu$m to 500 $\mu$m. The core 8 is rectangular in sectional shape having one side length of from 1 $\mu$m to 100 $\mu$m. The optical waveguide 1 is rectangular in sectional shape having one side length of from 5 $\mu$m to 500 $\mu$. The substrate 2 has a thickness of from 200 $\mu$m to 600 $\mu$m. The substrate 2 has a length and width of from 1 mm to 50 mm. Various dielectric materials can be used as a material for the core 8 and cladding 9, including silicon dioxide, glass material such as silicon dioxide doped with fluorine or boron, polyurethane, organic material such as epoxy, niobium oxide, metal oxide such as zinc oxide, and so on.

The deposition method for the core 8 and cladding 9 uses a method suited for a material therefor. In the case of for example silicon oxide, employed is vapor phase process (hereinafter abbreviated as CVD), sputtering, vacuum evaporation or the like. The material for the substrate 2 uses a silicon single crystal, glass, quartz glass, gallium arsenate or the like.

Light is introduced through a fixed portion end of the optical waveguide 1 shown in FIG. 1, so that the light is illuminated through a tip of the probe needle portion 5 of the optical waveguide 1 onto a measuring sample. Also, localized light on a sample surface is detected by the probe needle portion 5 tip, and introduced to a detector provided at a behind of an end of the fixed portion 3. The cantilever has a spring constant and resonant frequency that is adjustable by a length of the resilient function portion 4.

According to the optical waveguide probe, it is possible to illuminate light onto a sample to detect light information from the sample. Meanwhile, because the resilient function portion 4 can be shortened with a decrease in spring constant, the resonant frequency can be increased without an increase in the spring constant. Furthermore, because a silicon process can be used in manufacture, mass producibility is enhanced and shape reproducibility is high and even mechanical properties are obtained. Further, it is easy to handle including fixing and adjusting, similarly to the conventional AFM cantilever.

In addition, the long probe needle portion 5 allows easy measurement on a sample having a large step. Also, because the probe needle portion 5 is of a polygonal column instead of a flat plate, it is possible to easily measure on a sample not only in air but also within a liquid.

[Embodiment 2]

Figure 2:
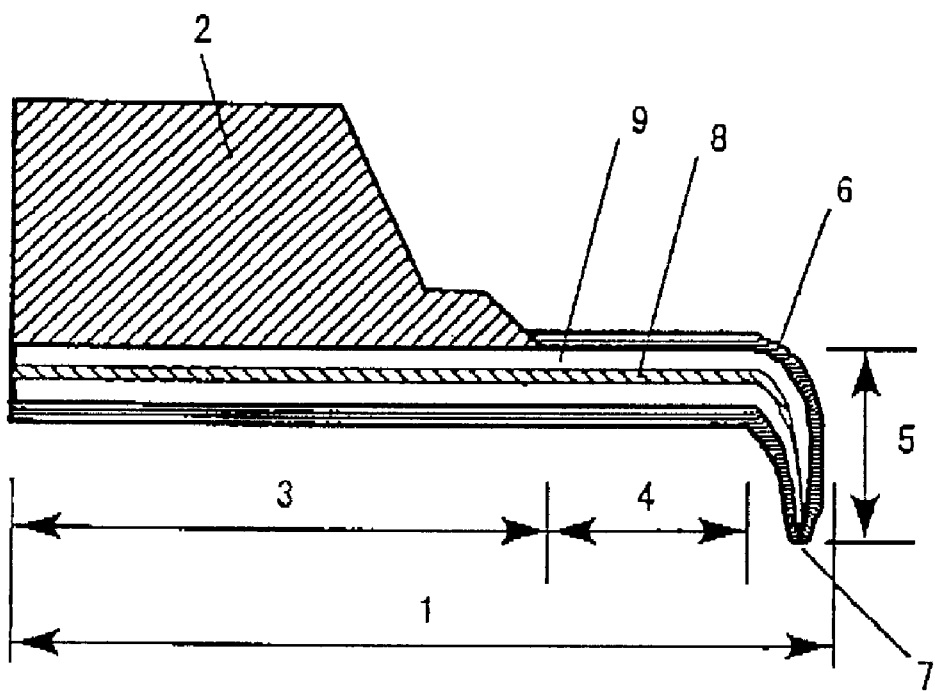
FIG. 2 is a structural view showing an optical waveguide probe according to Embodiment 2 of the present invention.

FIG. 2 is a structural view illustrating an optical waveguide probe showing Embodiment 2 of this invention. The optical waveguide probe according to this Embodiment 2 is different from the optical waveguide probe according to the above Embodiment 1. It is characterized in that its optical waveguide 1 at periphery is covered by a metal film coating 6 and a probe needle portion has at its tip an aperture 7 covered at a periphery by the metal film coating 6. The metal film coating 6 covers over the portion other than that which is contacted with the substrate 2, as shown in FIG. 2. The metal film coating 6 has a thickness of from 100 $\mu$m to 1 $\mu$m. The diameter of the aperture 7 is from 10 $\mu$m to 500 $\mu$m. The dimensions of other elements are the same as those of Embodiment 1.

The material of the metal film coating 6 uses a material which reflects light, such as gold, platinum, aluminum, chromium, nickel or the like. The materials of the other elements use the same ones as those of Embodiment 1. In this optical waveguide probe, by introducing light from a fixed portion end of the optical waveguide 1, the light can be illuminated only through the aperture 7 formed in the probe needle portion 5. Also, the light localized on the sample surface can be detected by the tip of the probe needle portion 5 and introduced through the behind of the fixed portion end into the detector.

According to the above optical waveguide probe, because the aperture 7 is provided at the tip of the optical waveguide 1, it is possible to detect an optical property of a sample at a space resolution higher than that of the optical waveguide probe of Embodiment 1.

[Embodiment 3]

Figure 3:
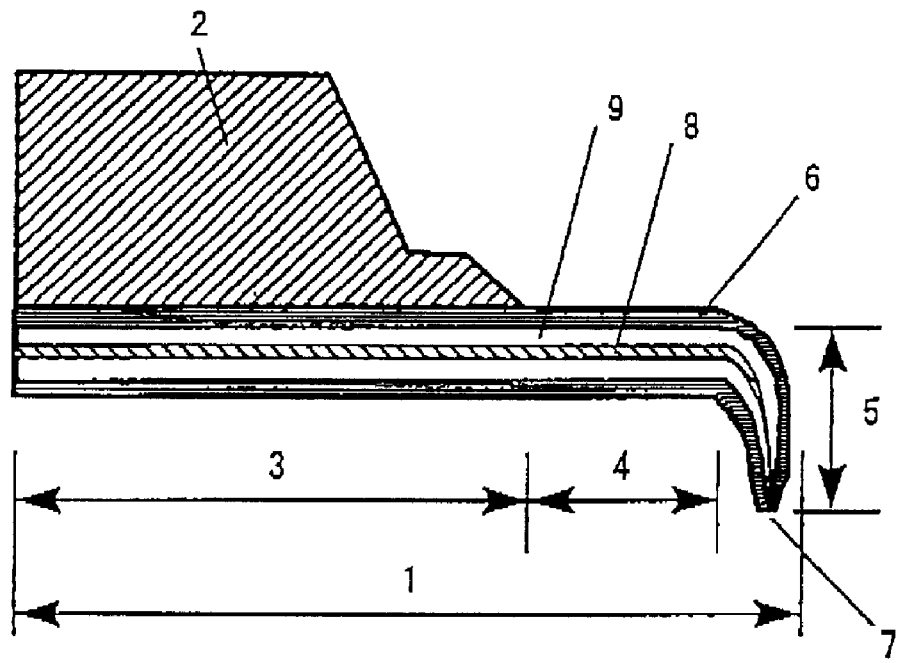
FIG. 3 is a structural view showing an optical waveguide probe according to Embodiment 3 of the present invention.

FIG. 3 is a structural view illustrating an optical waveguide probe showing Embodiment 3 of this invention. The optical waveguide probe according to this Embodiment 3 is different from the optical waveguide probe according to the Embodiment 2. it is characterized in that the optical waveguide 1 at its entirety is covered by a metal film coating, including the portion contacted with the substrate 2. Incidentally, the dimension of each element is same as that of the optical waveguide probe of Embodiment 2. Also, the material of each element forming the optical waveguide probe is same as that of Embodiment 2.

By introducing light from a fixed portion 3 end of the optical waveguide 1, the light can be illuminated only through the aperture 7 formed in the probe needle portion 5. Also, the light localized on the sample surface can be detected by the tip of the probe needle portion 5 and introduced through the behind of the fixed portion end into the detector.

According to the above optical waveguide probe, because the aperture 7 is provided at the tip of the optical waveguide 1, it is possible to detect a sample optical property with a higher space resolution than that of the optical waveguide probe of Embodiment 1, similarly to the above.

[Embodiment 4]

Figure 4:
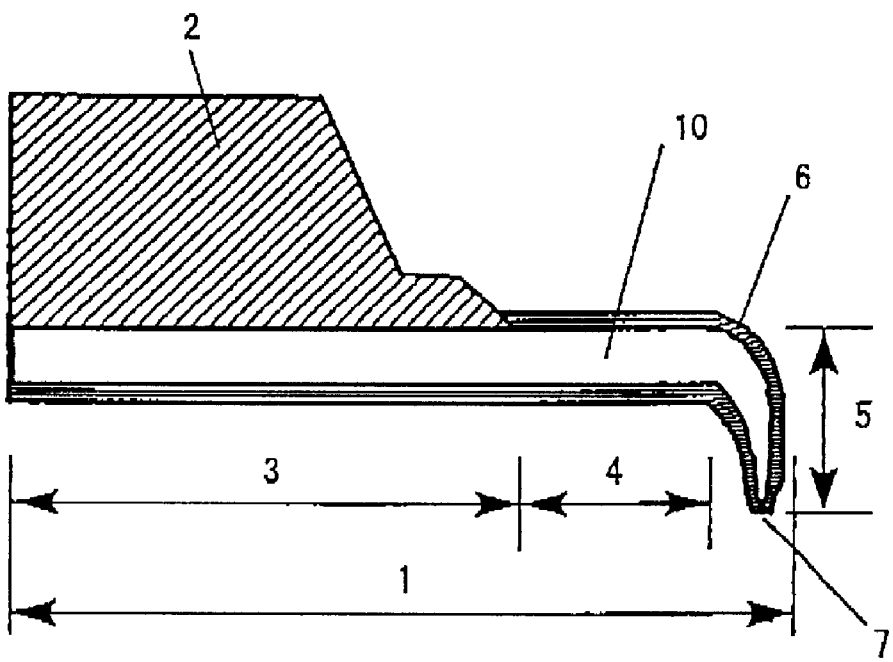
FIG. 4 is a structural view showing an optical waveguide probe according to Embodiment 4 of the present invention.

FIG. 4 is a structural view illustrating an optical waveguide probe showing Embodiment 4 of this invention. This optical waveguide probe characterized in that the optical waveguide 1 in Embodiment 2 is structured of a single light transmissive material 10. The light transmissive material 10 is rectangular in cross section with one side length of from 5 μm to 100 μm. The material and deposition method of the light transmissive material 10 are the same as those of core 8 and cladding 9 of Embodiment 1. The dimensions and materials of other elements are the same as those of Embodiment 2.

The optical waveguide probes shown in Embodiment 1 to Embodiment 3 require the introduction of light only to the core 8. However, according to the above optical waveguide probe, light may be introduced to the light transmissive material 10 that is thicker than the core 8. Accordingly, the introduction of light to the optical waveguide 1 is easier than in the optical waveguide probes shown in Embodiment 1 to Embodiment 3. Also, because the material of the optical waveguide 1 is single, manufacture is easier than for the optical waveguide probes shown in Embodiment 1 to Embodiment 3.

[Embodiment 5]

Figure 5:
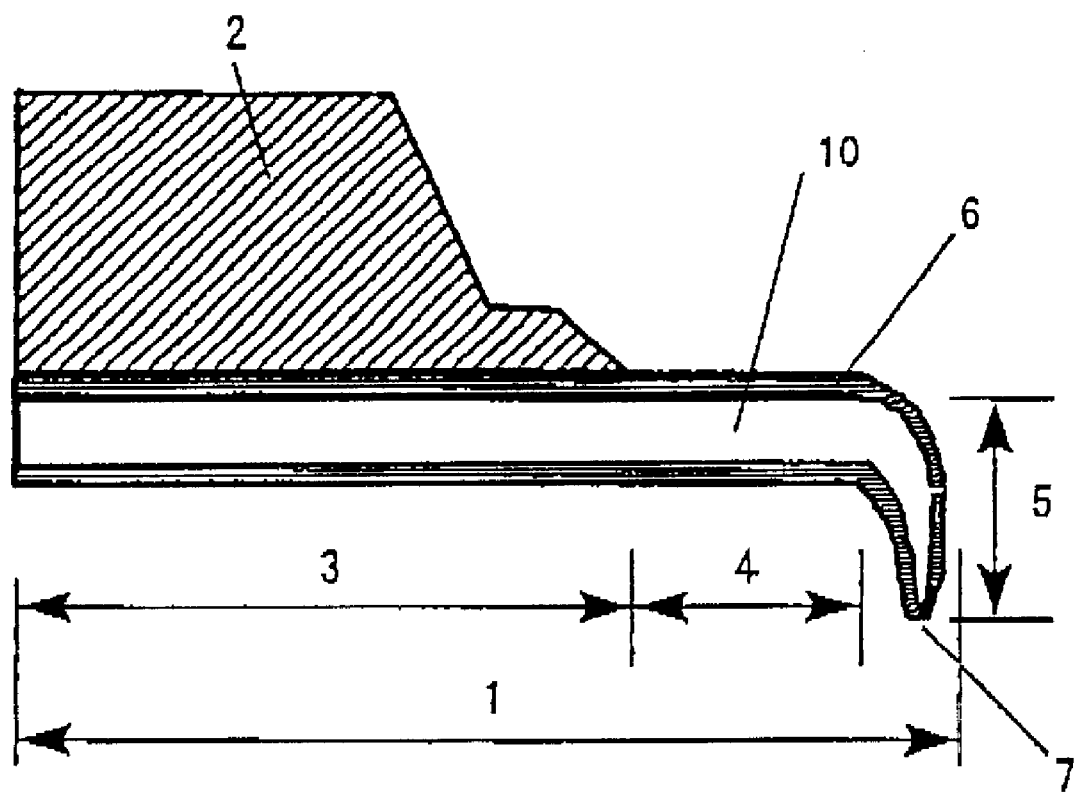
FIG. 5 is a structural view showing an optical waveguide probe according to Embodiment 5 of the present invention.

FIG. 5 is a structural view illustrating an optical waveguide probe shown in Embodiment 1 to Embodiment 3 of this invention. This optical waveguide probe is characterized in that the optical waveguide 1 of Embodiment 3 is structured of a single light transmissive material 10. The shape, dimension, material and deposition method of the light transmissive material 10 are same as those of Embodiment 4. The dimension and material of the other elements are same as those of Embodiment 2, and explanations are omitted.

[Embodiment 6]

Figure 6A:
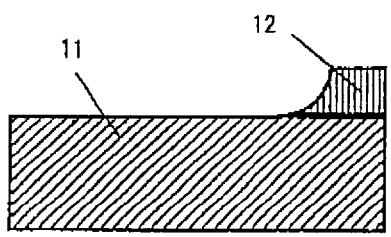
FIGS. 6A, 6B, 6C, 6D, 6E, 6F, 6G and 6H are explanatory views showing a manufacturing method for an optical waveguide probe according to Embodiment 6 of the present invention.

FIGS. 6A, 6B, 6C, 6D, 6E, 6F, 6G AND 6H are explanatory views showing a manufacture method for the optical waveguide probes of Embodiments 1–5. FIG. 6A depicts a process to form an optical waveguide mold on a substrate, showing a state that an etch mask 12 is formed on a substrate 11. Incidentally, it is assumed hereunder that a top surface of the substrate 11 is a main surface while an underside of the substrate 11 is a back surface. The etch mask 12 possesses distribution i thickness. The thickness of the substrate 11 is from 200 μm to 1 μm. The etch mask 12 has a maximum thickness portion with a thickness of from 100 μm to 100 μm. A substrate 2 is formed by the substrate 11 wherein the material of the substrate 11 is the same as that of the substrate 2.

The etch mask 12 is of a dielectric such as photoresist or $SiO_2$ or metal such as Al or Cr. Also, a semiconductor such as GaAs or InP is usable. In the case where photoresist is used as a etch mask 12, the photoresist is exposed using a photo mask having a gradation with an emulsion mask or dot pattern into an etch mask 12 having a thickness distribution. Where dielectric or metal is used as a mask material, the etch mask 12 is formed by forming photoresist having a thickness distribution as above on a mask material and anisotropically dry etched by such as reactive ion etching (hereinafter abbreviated as RIE) to transfer a resist shape onto the mask material. Also, the etch mask 12 may be formed having a thickness distribution by patterning the mask material through isotropic etching such as dry etching or wet etching.

Figure 6B:
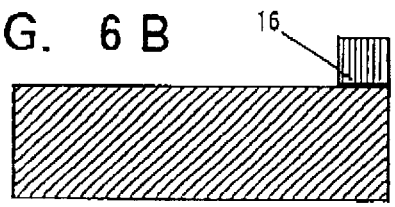
Figure 6C:
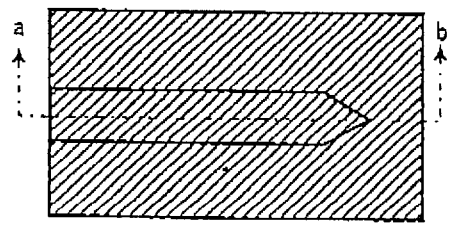
Figure 6D:
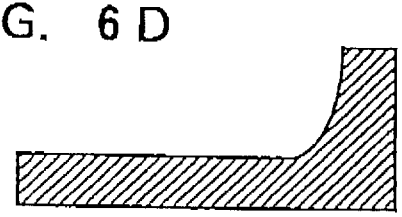

FIG. 6C depicts a process to form a mold for an optical waveguide on the substrate, as a top plan view in a state that a mold for embedding an optical waveguide is formed. Meanwhile, FIG. 6D is a sectional view taken along line a–b in FIG. 6C. The optical waveguide mold, if represented by a three dimensional shape, is a hollow having a vessel shape. The area corresponding to an optical waveguide probe needle portion 5 is moderately bent. The depth of the hollow is from 5 μm to 500 μm. The optical waveguide mold is formed using the etch mask 12 by anisotropic dry etching with an RIE or induction coupling plasma etching apparatus.

Because the etch mask 12 has a thickness distribution, if it is formed by anisotropic dry etching, a similar shape to the etch mask 12 is transferred onto the substrate 11 in a depth direction. It may be formed using the etch mask 12 by isotropic dry etching or wet etching. Otherwise, it may be formed using the etch mask 12 on a silicon substrate by anisotropic etching.

Meanwhile, FIG. 6B depicts a process to form a mold for embedding an optical waveguide in the substrate, illustrating a state that an etch mask 16 is formed on the substrate 11. The etch mask 16 has a thickness of from 100 nm to 100 μm. The mask material is dielectric such as photoresist or $SiO_2$ or metal such as Al or Cr and semiconductor such as GaAs or InP. In the case of using the etch mask 16, a mold for embedding an optical waveguide may be formed utilizing etch undercut at the beneath of the etch mask 16 by an isotropic dry etch or wet etch process. Also, a mold for embedding an optical waveguide can be formed by anisotropic wet etching on a silicon substrate using the etch mask 16.

Figure 6E:
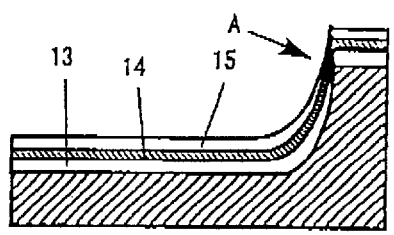

By embedding an optical waveguide in a mold having a moderate curve as shown in FIG. 6D, an optical waveguide probe can be formed in a hook form. FIG. 6E depicts a process to embed an optical waveguide in an optical waveguide embedding mold, illustrating a state formed with an optical waveguide. On the substrate 11 a cladding material 13 is deposited and a patterned core material 14 is deposited thereon. Further, over that a cladding material 15 is deposited. The refractive index of the cladding material 13 and the cladding material 15 is lower relative to the refractive index of the core material 14. The refractive index of the cladding material 13 and the cladding material 15 is the same. Meanwhile, the cladding material 13 and the cladding material 15 may be different in refractive index. The cladding material 13 has a thickness of from 1 μm to 300 μm. The core material 14 has a thickness of from 1 μm to 10 μm. The core material 14 after patterned has a total width of from 1 μm to 10 μm with respect to a vertical direction of the page. The cladding material 15 has a thickness of from 1 μm to 300 μm.

First, a cladding material 13 is deposited in the mold for embedding an optical waveguide shown in FIG. 6D. Then a core material 14 is deposited and patterned using photolithography. At this time, if the mold for embedding an optical waveguide is large in step and photoresist is difficult to evenly apply, electro-deposition resist is effectively used. To use electro-deposition resist, a core material 14 is first deposited and then electro-deposition resist is applied after depositing a conductive metal of Ni, Au, Al or Cr as an electrode material, followed by patterning using photolithography. Then a cladding material 15 is deposited. The method of depositing the cladding material 13, core material 14 and cladding material 15 includes CVD, sputtering, vacuum evaporation, etc. Where silicon dioxide is used as a material for the cladding material 13, core material 14 and cladding material 15, the refractive index is controlled by doping fluorine, germanium, or boron. Meanwhile, where CVD is used as a deposition method, the refractive index can be varied by output control during deposition.

Figure 6F:
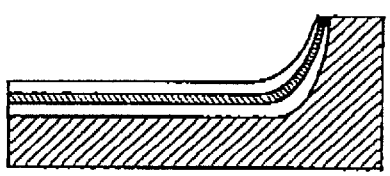

FIG. 6F depicts a process to separate the optical waveguide along the mold for embedding the optical waveguide, illustrating a state the optical waveguide is separated. In the state as shown in FIG. 6E, a resin is filled in a hollow area and thereafter the substrate 11 is abraded by polishing or lapping to the original plane. After abrasion, the removal of the filled resin provides a state of FIG. 6F. Where the cladding 13, core 14 and cladding 15 are deposited in the mold for embedding an optical waveguide, the thickness of a dielectric deposited is small at a wall portion shown by an arrow A in FIG. 6E as compared to a parallel region on the substrate. Consequently, after abrasion the optical waveguide 1 has a probe needle portion 5 given a sharpened state in the vicinity of its summit. Also, without using abrasion, the optical waveguide can be separated by photolithography.

Figure 6G:
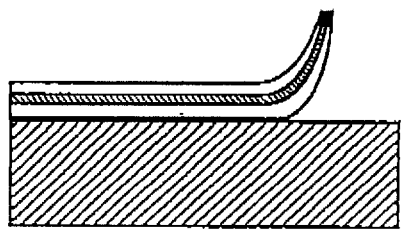
Figure 6H:
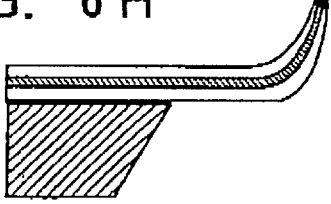

FIG. 6G and FIG. 6H illustrate a process to separate the optical waveguide probe from the substrate, respectively, showing a state the optical waveguide is exposed on a main surface and a state the optical waveguide probe is separated. In FIG. SF the optical waveguide is exposed by performing dry etching or wet etching from the main surface of the substrate 11 into a state of FIG. 6G. Thereafter, where the substrate 11 is silicon, the optical waveguide probe is separated by anisotropical etching from the back surface using potassium hydroxide (KOH) or tetramethyl ammonium hydroxide (TMAH). Where the substrate 11 is other than silicon, the optical waveguide probe is separated by performing dry etching or wet etching from the back surface.

According to the process described above, it is possible to easily manufacture an optical waveguide probe of Embodiment 1. The manufacturing method for an optical waveguide probe of Embodiment 2 can be carried out by making an optical waveguide probe in the manufacture method for Embodiment-1 optical waveguide probe and thereafter depositing a metal material such as Al or Cr to form a metal film coating 6 around the optical waveguide 1. The manufacturing method for Embodiment-3 optical waveguide probe can be carried out by depositing a metal material to form a metal film coating 6 prior to the process explained in FIG. 6E, putting forward the process to FIG. 6H, and finally depositing a metal material to be formed into a metal film coating 6 over the entire optical waveguide 1.

The manufacturing method for the optical waveguide probes of Embodiment 4, 5 deposits only a light transmissive material 10 instead of depositing a cladding 13, core 14 and cladding 15 in the process explained in FIG. 6E. The other processes are same as the optical waveguide probe manufacture method of Embodiment 2, 3. The aperture 7 is removably formed by etching the metal at the tip of the probe needle portion 5. The aperture 7 may be formed by depressing, after metal deposition, the tip portion onto a solid surface. Also, the aperture 7 may be formed by, after metal deposition, depositing a mask material such as photoresist to conduct dry etching such as RIE.

[Embodiment 7]

FIGS. 7A, 7B and 7C are explanatory views illustrating an optical waveguide probe manufacturing method according to Embodiment 7 of this invention. This figure shows a process to form a mold for an optical waveguide in the substrate, wherein the other processes are same as in Embodiment 6. FIG. 7A shows a state that an etch mask 17 is formed on the substrate 11. The etch mask 17 is an etch mask formed in a step form with at least two steps or more. The substrate 11 uses silicon. The etch mask employs dielectric such as silicon dioxide, silicon nitride or photoresist.

FIG. 7C illustrates a state that a mold is formed to embed therein an optical waveguide. FIG. 7B illustrates a state that an etch mask 17 is used to conduct anisotropic etching, showing a state that a first step of the etch mask 17 formed stepwise is left. Thereafter, if etching is continued, the first step of the etch mask 17 is removed to leave a second step and the subsequent. In this state if etching is continued, a state of FIG. 7C is obtained. Also, the etching may be stopped in the state the first mask is left to obtain a state of FIG. 7B, and the left first step mask is removed by etching and then the etching is further continued with the second step mask into a state of FIG. 7C.

In this manner, it is possible to form a smoothly slanted surface of a mold for embedding an optical waveguide by conducting anisotropic etching using an etch mask 17 formed stepwise with at least two steps or more. Furthermore, the manufacture of an optical waveguide probe using a mold having such a smoothly slanted surface makes it possible to emit the light introduced in the optical waveguide 1 through a tip of the optical waveguide 1. Also, the localized light on a sample surface detected by the optical waveguide tip can he efficiently transmitted and outputted to the other end of the optical waveguide.

[Embodiment 8]

Figure 8A:
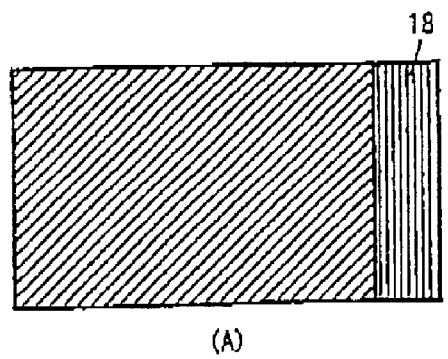
FIGS. 8A, 8B and 8C are explanatory views showing a manufacturing method for an optical waveguide probe according to Embodiment 8 of the present invention.
Figure 8B:
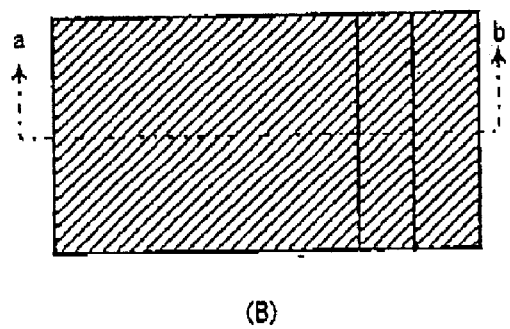
Figure 8C:

FIGS. 8A, 8B and 8C illustrate an explanatory view showing an optical waveguide probe manufacturing method according to Embodiment 8 of this invention. FIG. 8A illustrates a process to form a mold for an optical waveguide in the substrate, showing a top plan view in a state an etch mask 18 is formed on the substrate 11. The etch mask 18 uses a same one of any of the etch mask 12, etch mask 16 and etch mask 17.

FIG. 8B illustrates a process to form a mold for embedding an optical waveguide in the substrate, as a top plan view in a state a mold for embedding therein an optical waveguide is formed. Also, FIG. 8C is a sectional view taken along line a–b in FIG. 8B. The mold for embedding an optical waveguide is a step having a slant surface connecting between two of a parallel flat plane and a parallel flat plane, wherein the slant surface comprises one or more planes. Meanwhile, the slant surface connecting the parallel flat planes may be a curved surface. The method of forming a mold to embed an optical waveguide differs depending on the kind of an etch mask 18, and the method is same as in Embodiment 6, 7. After forming a mold for embedding an optical waveguide, an optical waveguide is formed in layer thereon. The method and material in layering an optical waveguide is same as in Embodiment 6.

Figure 8D:
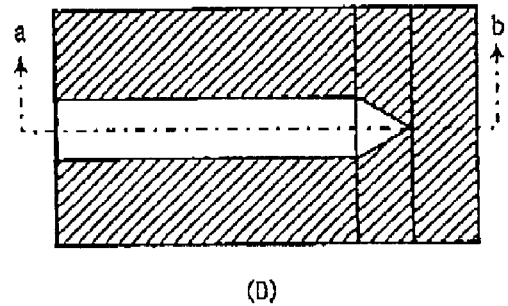
Figure 8E:
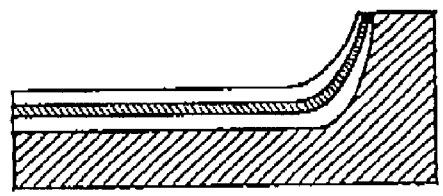

FIG. 8D illustrates a process to pattern an optical waveguide into a probe form, which is a top view showing a patterned optical waveguide in a probe form. FIG. 8E is a sectional view taken along line a–b in FIG. 8D. After forming an optical waveguide, patterning is made using photolithography. Electro-deposition resist is effectively used for a case that photo resist be difficult to evenly apply due to large step in the optical waveguide embedding mold. To use electro-deposition resist, an optical waveguide 1 is first deposited and thereafter a conductive metal of Ni, Au, Al or Cr as an electrode material is deposited, and then electro-deposition resist is applied and patterned using photolithography. The process for separating the optical waveguide probe from the substrate to be conducted thereafter is same as in Embodiment 6.

[Embodiment 9]

Figure 9:
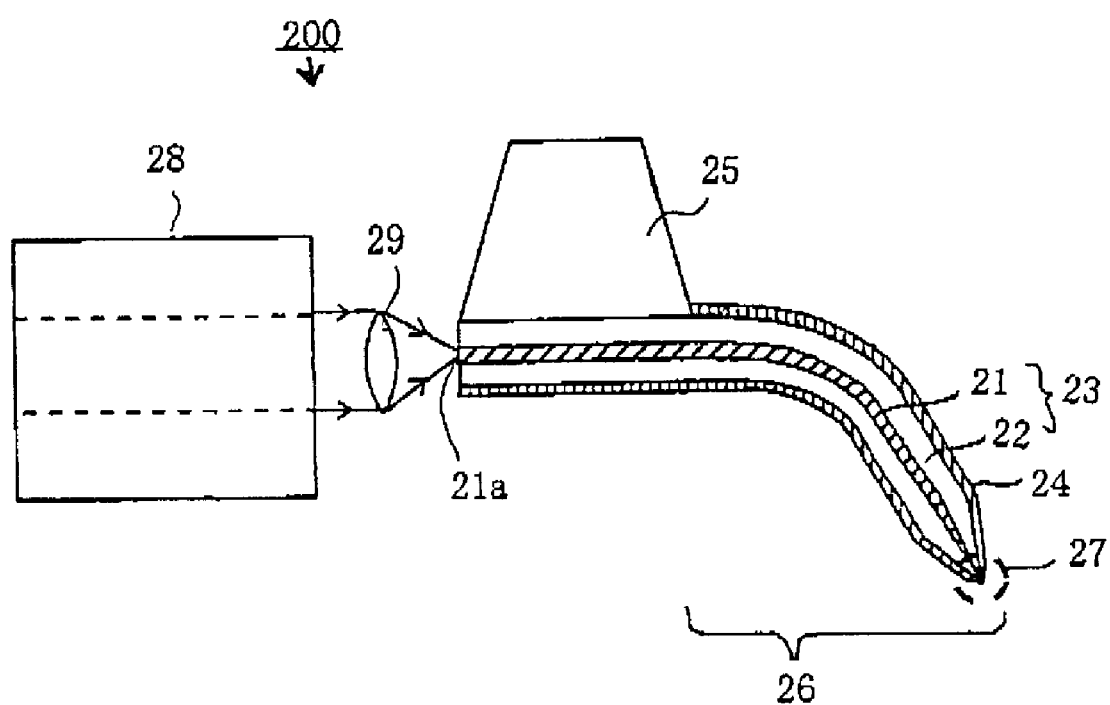
FIG. 9 is structural view showing an optical waveguide probe according to Embodiment 9 of the present invention.

FIG. 9 is a structural view illustrating an optical waveguide probe according to Embodiment 9 of this invention. This optical waveguide probe 200 is structured by an optical waveguide 23 formed by a core 21 for transmitting light and a cladding 22 having a different refractive index therefrom, a light reflective layer 24 covering this optical waveguide 23, and a substrate 25 supporting this optical waveguide 23. A cantilever 26 is moderately bent toward an opposite side of the substrate 25. The amount of bending is to such a degree as not to cause optical loss. The cantilever 26 has a tip entirely sharpened.

Figure 10:
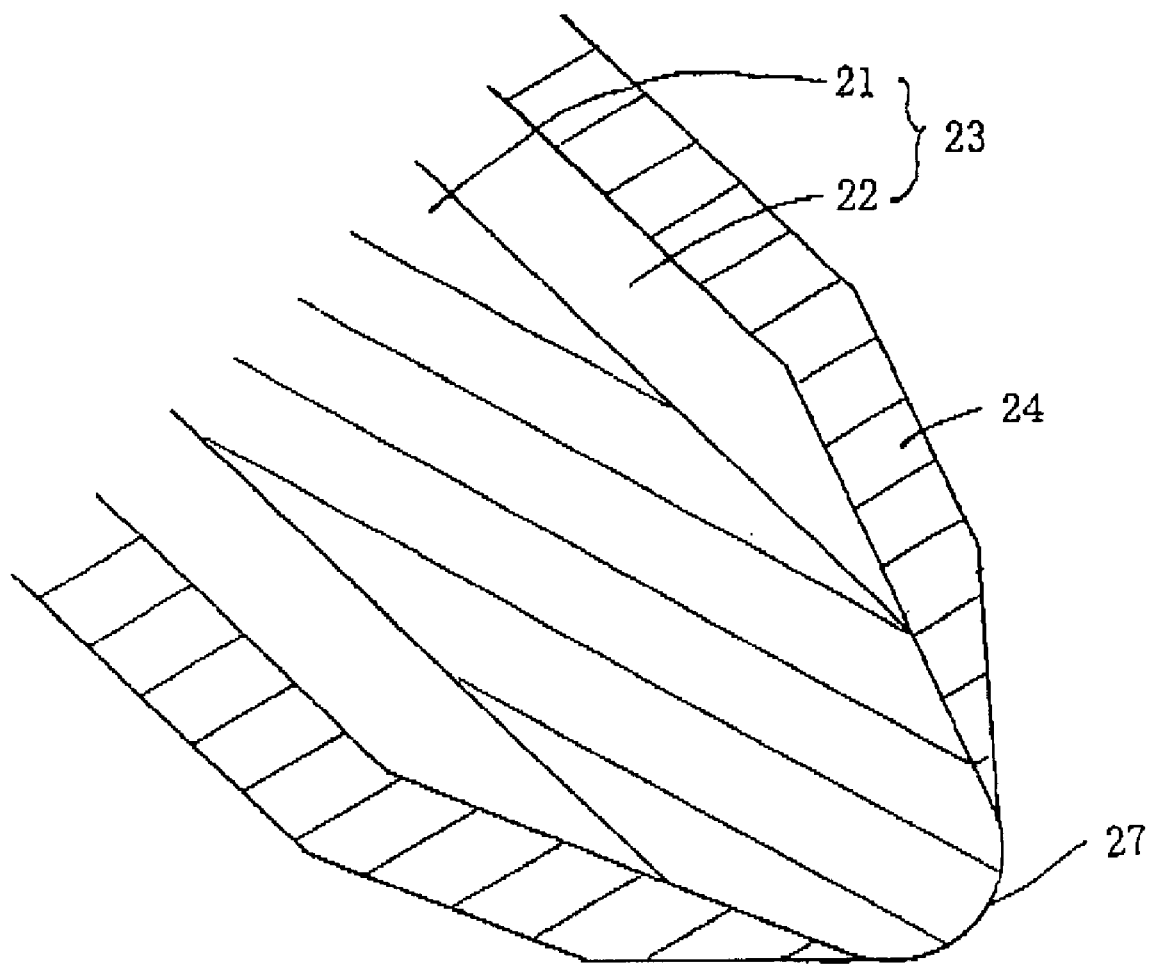
FIG. 10 is a magnified view of a cantilever 26 in the vicinity of a tip according to the present invention.

FIG. 10 is a magnified view of around the tip of the cantilever 26. In this manner, at the tip of the cantilever 26 the core 21 projects from the cladding 22 or the light reflective layer 24, forming an aperture 27. A method for forming an aperture 27 will be hereinafter described in detail. The aperture 27 tip has a radius of curvature given smaller than 100 nm. The near field microscope has an optical resolution increasing in inverse proportion to a radius of curvature of the aperture 27. On the other hand, the core 21 and cladding 22 has an end exposed to the outside on a substrate side of the optical waveguide 23.

The concrete size of the optical waveguide probe 200 is a cantilever 26 length of 50 µm–3000 µm, a width of 3 µm–300 µm, and a thickness of 1 µm–20 µm. Also, the optical waveguide 23 has a length of 1–50 mm and a width of 10–1000 µm. The substrate 25 has a thickness of 100 µm–1000 µm and an area of 1–2500 square mm.

The resonant frequency for the optical waveguide probe 200 is set at 1 kHz–1 MHz. This is for AFM high speed operation. The spring constant is set small, i.e. 0.001 N–100 N/m. By decreasing the spring constant, it is possible to decrease the interaction between the optical waveguide probe and the sample and to accurately measure a soft substance, such as a biological sample or a polymer sample, without damage.

Explanation is made on a light transmission form in an illumination mode of the optical waveguide probe 200. An optical fiber 28 is installed on the substrate 25 side of the optical waveguide probe 200. The light emitted from the optical fiber 28 is collected on a core end face 21a by a focus lens 29. The light introduced from the core end face 21a to an inside of the optical waveguide 23 passes through the core 21 and reaches the tip of the optical waveguide probe 200. A part of the light is illuminated through the aperture 27 to a sample surface. Because the aperture 27 is set in diameter smaller than a light wavelength, the aperture 27 emits evanescent light significantly attenuated on an order of the aperture diameter.

Also, the light from the optical fiber 28 may be directly introduced without using the focus lens 29. Furthermore, a light source may be placed directly on the substrate 25 side of the optical waveguide probe 200, without using an optical fiber 28. Also, this optical waveguide probe 200 can be used also in a collection mode. In this case, the light introduced through the aperture 27 passes the core 21 inside the optical waveguide 23 and emitted through the core end face 21a on the substrate side.

According to the optical waveguide probe 200, it is possible to obtain a resolving power exceeding a light diffraction limit. Next explained is a method for manufacturing this optical waveguide probe 200. FIGS. 11A and 11B are flowcharts showing process for manufacturing this optical waveguide probe 200. FIG. 12 to FIG. 14 are explanatory views showing a process for manufacturing the optical waveguide probe 200.

Figure 12A:
FIGS. 12A, 12B, 12C, 12D, 12E, 12E' are explanatory views showing a manufacturing process for the optical waveguide probe shown in FIG. 9.

FIG. 11A is an explanatory view demonstrating one manufacturing method for an optical waveguide probe 200. In step S1101, a substrate 25' is rested on a work table. A silicon wafer (with a thickness of 100 µm–1000 µm) is used for a material of the substrate 25'. Besides a silicon wafer, it is possible to use a dielectric crystal such as of glass or quartz, a semiconductor crystal such as of Si or GaAs, or a polymer material (FIG. 12A).

Figure 12B:
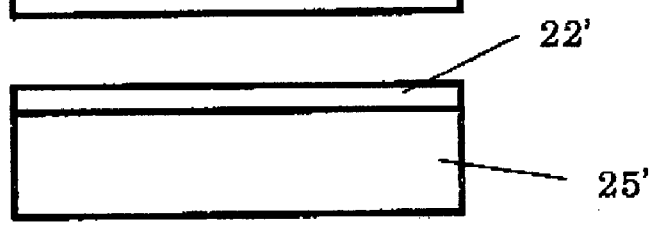
Figure 12C:
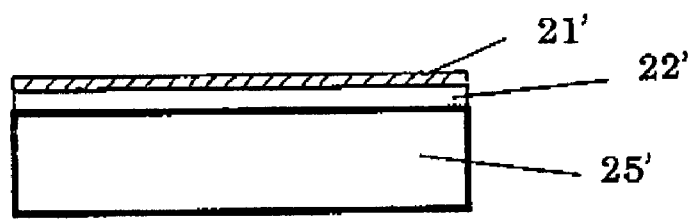

In step 51102, a cladding 22' (thickness 0.1 µm–5 µm) is formed on the silicon wafer (FIG. 12B). In step S1103, a core 21' (thickness 3 µm–10 µm) is formed on the cladding 22' (FIG. 12C). In step S1104, a cladding 22' is formed on the core 21' (FIG. 12D).

For the core 21' and cladding 22', different refractivities of silicon oxide are formed by a sputtering method, CVD method, or vacuum evaporation method. For example, in plasma CVD, by introducing a fluorine gas for film forming, a low refractive index film can be formed that is to serve as a cladding layer. Incidentally, boron or phosphorus may the doped to silicon oxide to form different retractivities of films.

Also, the materials to be used for the core 21' and cladding layer 22' include, besides the above, glass, quartz, dielectric material such as silicon nitride, polymer material such as poly methyl methacrylate or polyimide.

Figure 12D:
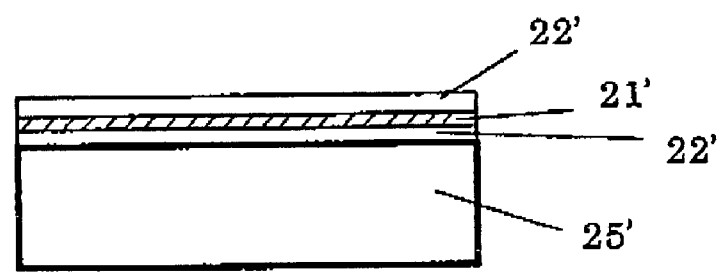
Figure 12E:
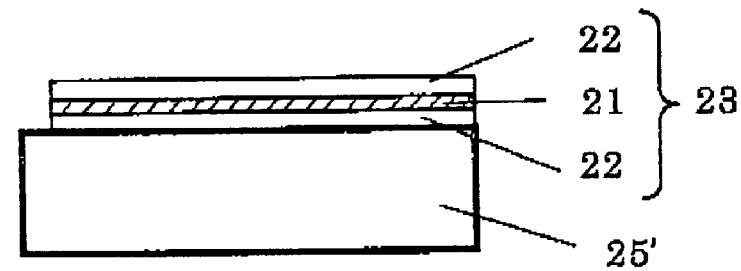
Figure 12E:
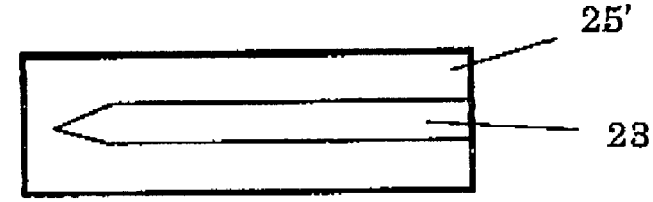

In step S1105, a pattern for an optical waveguide 23 is formed (FIG. 12D). The pattern for an optical waveguide 23 is formed along a mask form made by photolithography by dry etching method with anisotropy due to reactive ion etching or induced plasma etching. The mask material employs amorphous silicon, polysilicon, single crystal silicon, metal film such as of Cr, Al, WSi, Ni or Au, or photo resist. A top view of an optical waveguide 23 pattern is shown in FIG. 12E'. The optical waveguide 23 is formed sharp at its tip.

Figure 13F:
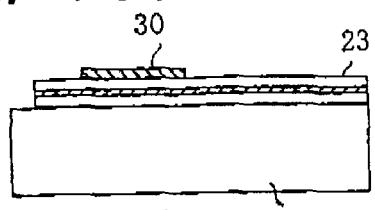
FIGS. 13F, 13F', 13G, 13G', 13H, 13I, 13I', 13J and 13J' are explanatory views showing a manufacturing process for the optical waveguide probe shown in FIG. 9.

In step S1106, polyimide 30 (thickness 1 µm–20 µm) is formed on the cladding 22 (FIG. 13F). Although a mask pattern process is required for forming this polyimide 30, it is a well known technology and explanation is omitted.

Using this polyimide 30, bending is provided for the cantilever 26. A bending process will be described hereinafter. Where photo sensitive polyimide is used, a pattern is formed by photolithography, simplifying the process. The photo sensitive polyimide is applied by a technique of spin coating, dip coating or spray coating. Pt this time point, baking is conducted at approximately 70–100° C. Also, it is possible to use as another material a material that is high in thermal coefficient of expansion such as an epoxy-based resin or polymer material.

Figure 13G:
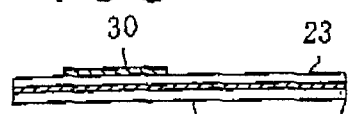

In step S1107, the silicon wafer is etched to form a substrate 25 (FIG. 13G). Etching is carried out from a back surface side using wet etching with anisotropy such as a potassium hydroxide (KOH) solution or tetramethyl ammonium hydroxide (TMAH). Alternatively, anisotropic or isotropic dry etching is usable.

Figure 13H:
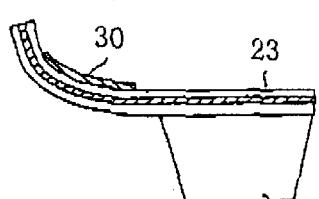

In step S1108, bending is provided for the cantilever 26 by the utilization of a difference in thermal coefficient of expansion between silicon oxide and polyimide (FIG. 13H). The polyimide 30 is again cured at a high temperature (400° C.–500° C.). The polyimide 30 high in thermal coefficient of expansion, if returned to a room temperature, contracts. As a result, large stresses are applied over a top surface of silicon oxide and the cantilever 26 is bent in an opposite direction to the substrate 25.

Figure 13I:
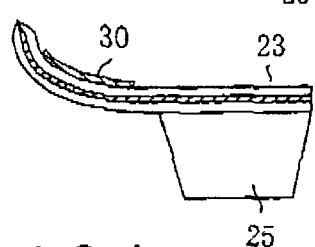

In step S1109, the cantilever 26 is sharpened by etching (FIG. 13I). A chemical etch method with a hydrogen fluoride solution is employed for a method to sharpen the tip of the optical waveguide 23. A basic method of chemical etching includes immersion in a hydrogen fluoride solution with a volumetric ratio of NH4F (40 wt %): HF (50 wt %): H2O=5–50:1:1 for 5 to 90 minutes to remove an end of the cladding 22, etching the core 21.

Figure 14A:
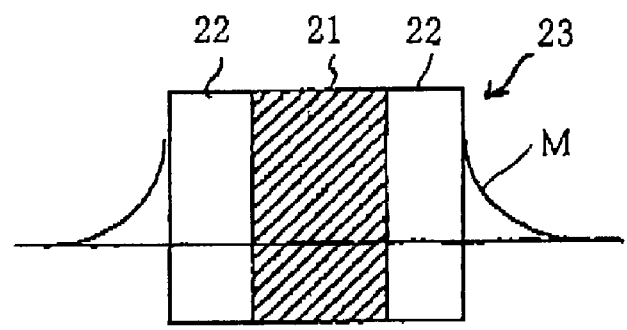
FIGS. 14A, 14B and 14C are explanatory views showing a manufacturing process for the optical waveguide probe shown in FIG. 9.
Figure 14B:
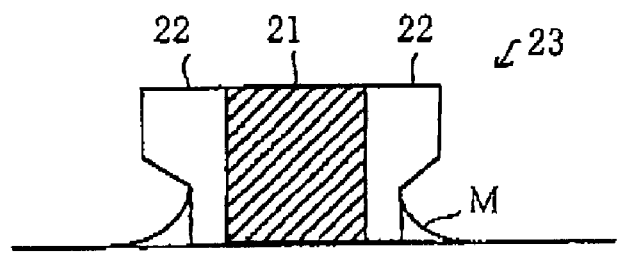
Figure 14C:
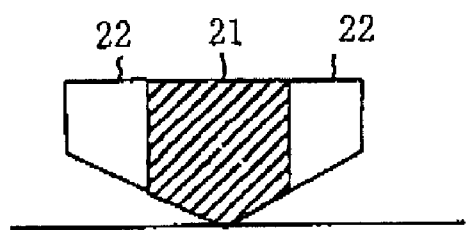

FIGS. 14A, 14B and 14C are explanatory views illustrating a sharpening process. The optical waveguide 23 formed through up to the step S1108 is immersed in a hydrogen fluoride solution (FIG. 14A). If the optical waveguide 23 is immersed in a hydrogen fluoride solution, a meniscus M is produced around the optical waveguide 23 due to a surface tension of hydrogen fluoride. The optical waveguide 23 at a portion around that covered by the meniscus M is tapered off by etch progression (FIG. 14B). The meniscus M becomes small as the optical waveguide 23 becomes thinner. As a result of etch progression, the optical waveguide 23 is sharpened (FIG. 14C). According to this method, it is possible to provide the tip portion with a radius of curvature in dimension of approximately 2 μm. Also, high reproducibility of tip angle is available because the core 21 sharpened angle is determined by a concentration fluorine in the core 21.

Figure 13J:
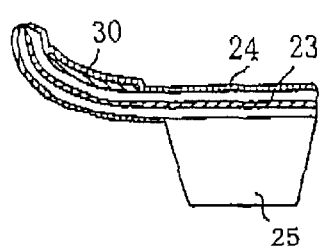
Figure 13F:
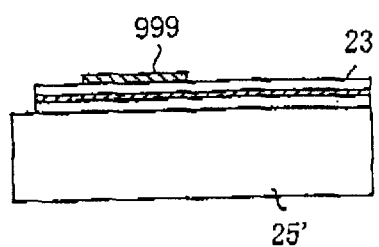
Figure 13G:
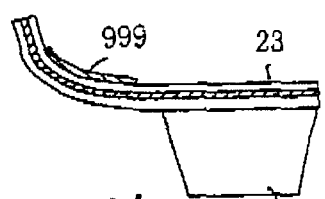
Figure 13I:
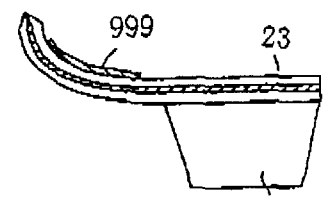
Figure 13J:
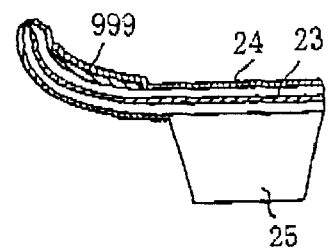

In step S1110, a light reflective layer 4 is formed over the optical waveguide 23 (FIG. 13J). By structuring the light reflective layer 24, where light is introduced into the optical waveguide probe 200 (collection mode), it is possible to remove the light noise from a side surface. On the other hand, where light is illuminated from the optical waveguide probe 200 (illumination mode), it is possible to impinge light only onto the aperture 27 region. AS a result, resolving power can be improved. A metal film such as of Cr, Al, Au or Ni is suited for a material of the light reflective layer 24. The coating method employs a sputter method, vacuum evaporation method or electroless plating method.

In this case, the aperture 27 is also covered by the light reflective layer 24. Accordingly, the aperture 27 requires to be removed of the light reflective layer 24. This method uses aperture due to oxide or alkali etching or dry etching, or a method of mechanically removing by pressing the probe tip during AFM actuation. Meanwhile, when a light reflective film is formed by sputtering or vacuum evaporation, it is possible to form a microscopic aperture 27 if a film be formed in a direction tilted by 90 degrees from a direction of sputter or evaporation film forming.

Incidentally, no problem is caused in manufacture if the step S1106 and the step S1107 are reversed in order. Also, no problem is caused in manufacture if the step S1108 and the step s1109 are reversed in order.

FIG. 11B is an explanatory view demonstrating another manufacturing method for an optical waveguide probe 200. Step S1101 to Step S1105 are same as the process of FIG. 11A. In step S11061, silicon nitride 38 (thickness 0.1 μm–5 μm) is formed on the cladding 22 (FIG. 13F'). This silicon nitride 38 is overlaid by CVD and patterned using dry etching through a photolithographic process. The silicon nitride is overlaid in a high temperature state (higher than 400° C.) by CVD. Silicon nitride has a high thermal coefficient of expansion, with a result that it, if returned to a normal temperature, applied great stress to the cladding 22. The other dielectric materials may be used as another material without limited to silicon nitride.

In step S1107, the silicon wafer is etched to form a substrate 25 (FIG. 13G'). Etching is carried out from a back surface side using wet etching with anisotropy such as a potassium hydroxide (KOH) solution or tetramethyl ammonium hydroxide (TMAH). Alternatively, anisotropic or isotropic dry etching is usable. In this process, a cantilever 26 is formed and the cantilever 26 is bent by great stress applied to the cladding 22.

Step S1109 (FIG. 13I') is similar to process step S1109 (FIG. 13I) of FIG. 11A. Step S1110 (FIG. 13J') is similar to process step S1110 (FIG. 13J) of FIG. 11A.

As described above, the optical waveguide probe 200 is manufactured through the silicon process as above, enabling batch processing and being suited for mass production. Also, manufacture is on a wafer collective process, reducing variation. Furthermore, manufacture is by a silicon process, stabilizing product property. Also, the reduction in probe size increases the number per wafer, reducing cost.

[Embodiment 10]

FIGS. 15A, 15B, 15C and 15D are sectional views showing optical waveguide probes according to Embodiment 10 of this invention. In an optical waveguide 23 of a three layered structure shown in FIG. 15A, a cladding 22 and a core 21 are formed in film on a silicon water, and then patterned. Thereafter, a pattern for cladding 22 is formed. This optical waveguide 23 exhibits a favorable optical waveguide characteristic with less loss because the core 21 is completely covered by the cladding 22.

In an optical waveguide 23 of a three layered structure shown in FIG. 15B, a cladding 22, a core 21 and a cladding 22 are formed in film on a silicon wafer, and thereafter the three layers are patterned at one time. Due to this, the core 21 at its upper and lower surfaces contacts with the claddings 22. Due to the absence of a cladding 22 at side surfaces, the optical waveguide characteristic is inferior to that of the optical waveguide of FIG. 15A but the manufacture process can be reduced.

An optical waveguide 23 shown in FIG. 15C is of a two layered structure having a cladding 22 and a core 21 on a silicon wafer. In this optical waveguide, after film-forming the cladding 22 and the core 21, the two layers are patterned at one time. Because the cladding 22 exists only underside core 21, the waveguide characteristic is inferior to the optical waveguide of FIG. 15B but the manufacture process is further reduced.

An optical waveguide 23 shown in FIG. 15D is of a structure formed in film with only a core 21 on a silicon wafer. The core 21 at its periphery is covered by a light reflective layer or silicon wafer. The optical waveguide characteristic is inferior to that of the above optical waveguide but easiest in manufacture.

[Embodiment 11]

Figure 16A:
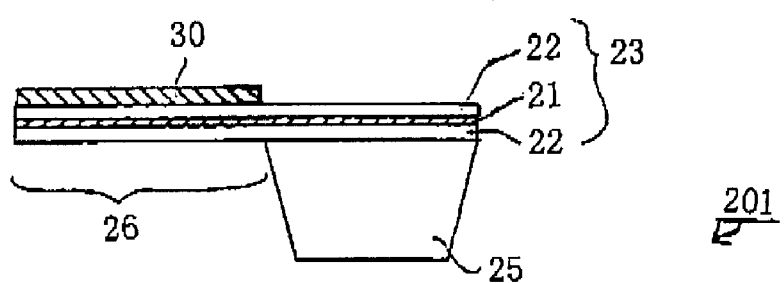
FIGS. 16A and 16B are explanatory views showing an optical waveguide probe according to Embodiment 11 of the present invent ion.
Figure 16B:
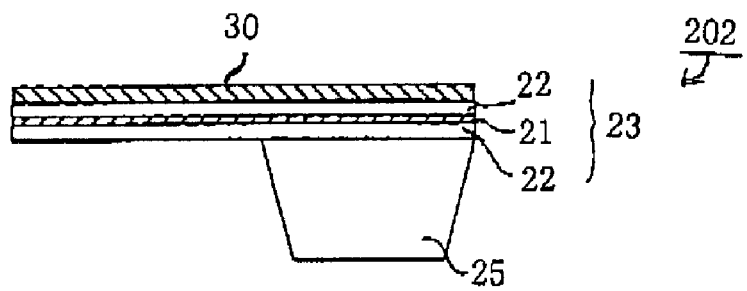

FIGS. 16A and 16B are explanatory views showing optical waveguide probes according to Embodiment 11 of this invention. These optical waveguide probes 201, 202 are modified in polyimide 30 forming pattern. In FIG. 16A, polyimide 30 is formed on over the entire region of the cantilever 26 as the polyimide 30 formed in the above step S1106. By doing so, the cantilever 26 can be largely and moderately bent in the bending process of the step S1108. This provides a favorable optical waveguide characteristic with less loss.

In an optical waveguide probe 202 of FIG. 16B, polyimide 30 was formed on over the entire cladding 22. This provides a further greater radius of curvature, further reducing optical loss. Also, no patterning is required for the polyimide 30, also providing an effect of reducing the manufacture process. In the optical waveguide probes 201, 202 of FIG. 16A or FIG. 16B, silicon nitride may be used in place of polyimide.

[Embodiment 12]

Figure 17A:
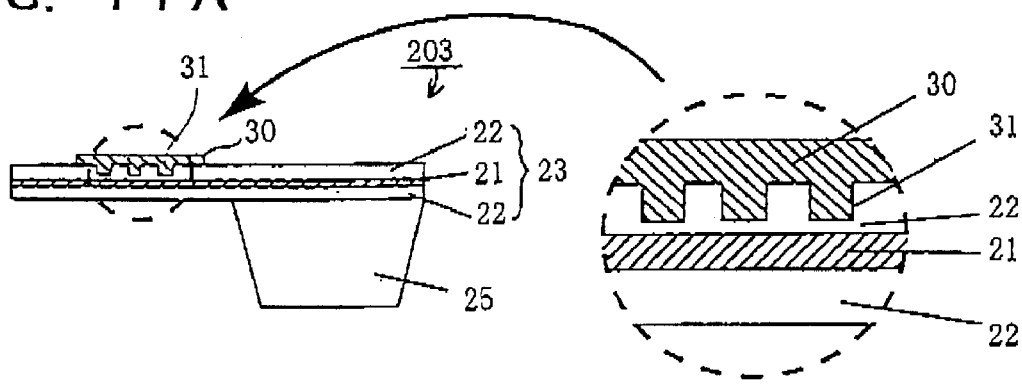
FIGS. 17A, 17B and 17C are explanatory views showing an optical waveguide probe according to Embodiment 12 of the present invention.
Figure 17B:
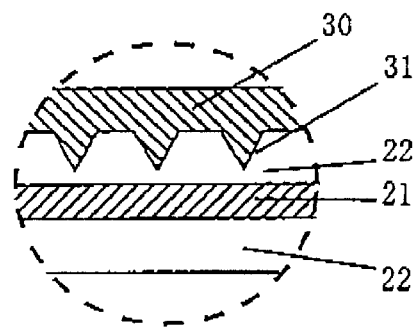
Figure 17C:
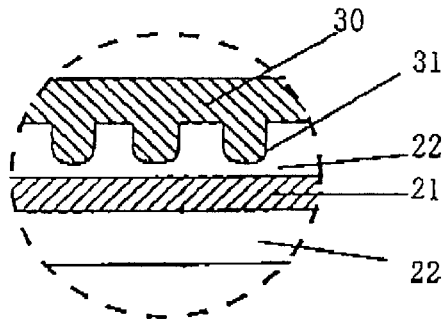

FIGS. 17A, 17B and 17C are explanatory views showing an optical waveguide probe according to Embodiment 12 of this invention. In an optical waveguide probe 203 of this Embodiment 12, the cantilever 26 is formed with grooves to locally reduce the thickness thereby enhancing a bending effect. As shown in FIG. 17A, grooves 31 rectangular in section are formed in the cantilever 26, and polyimide 30 is formed thereon. This reduces the moment of inertia of section on the cantilever 26, enabling large bending. Incidentally, the grooves 31 are formed after the cladding forming process (step S1104).

Also, the groove form is not limited to rectangular. For example, it may be in a sectionally wedge form as shown in FIG. 17B, or sectionally U-character form as shown in FIG.

17C. Further, the grooves may be provided in the cladding 22 on the substrate 25 side as shown in of FIG. 18A. Also, the grooves 31 may be formed in the claddings 22 on the upper and lower sides, as shown in FIG. 18B. Although not shown, the groove form in the same figure may be in a sectionally wedge form or sectionally U-character form as were shown in the above FIG. 17B and FIG. 17C. This can also largely bend the cantilever 26. In the optical waveguide probe 203 of FIGS. 17A, 17B, 17C and FIGS. 18A, 18, silicon nitride may be used in place of polyimide.

[Embodiment 13]

Figure 19:
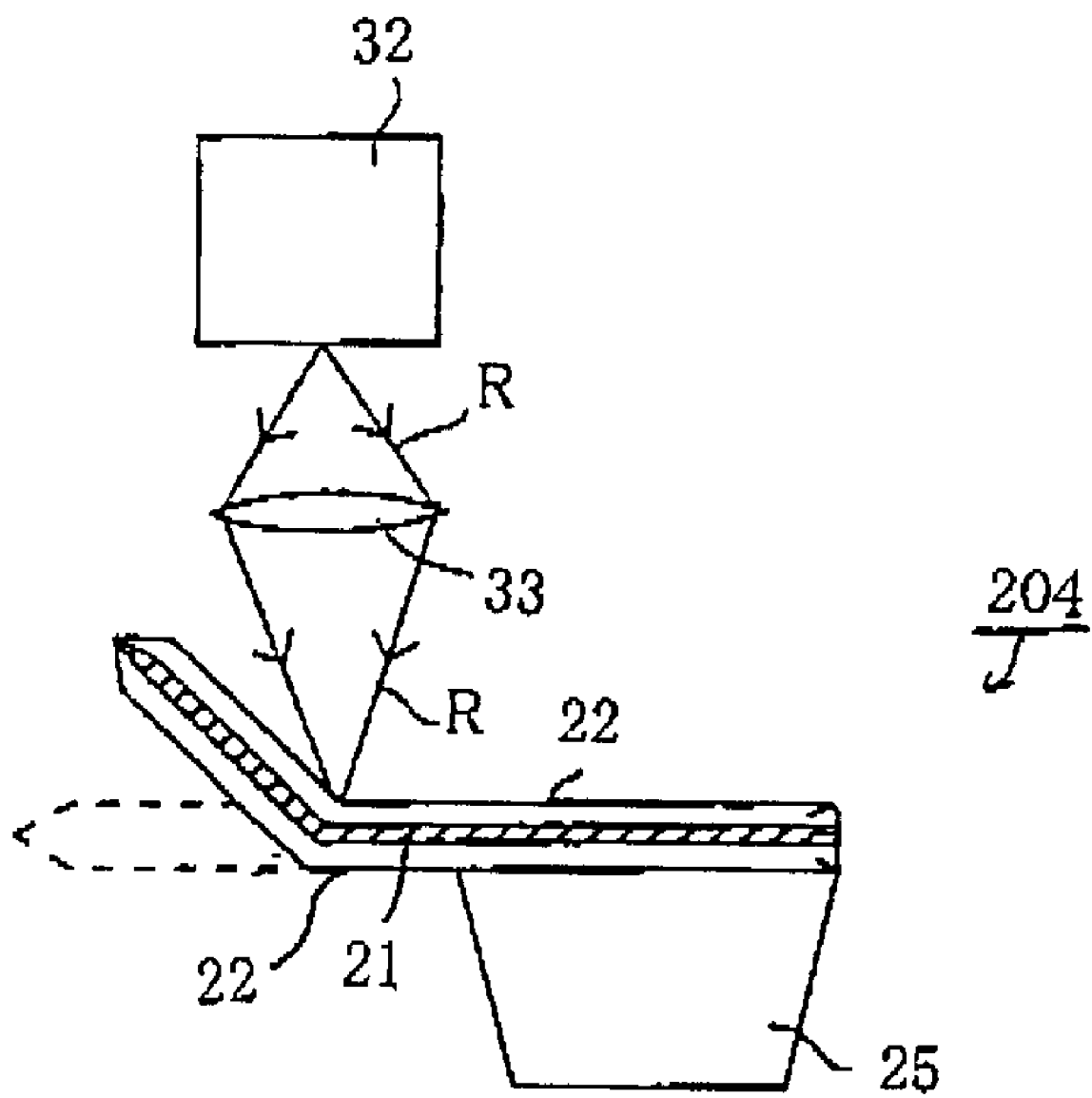
FIG. 19 is an explanatory view showing a manufacturing process for an optical waveguide probe according to Embodiment 13 of the present invention.

FIG. 19 is an explanatory view showing a method for manufacturing an optical waveguide probe according to Embodiment 13 of this invention. The manufacturing method for an optical waveguide probe 204 according to Embodiment 13 is characterized in that the cantilever 26 is bent by laser light heating without using polyimide 30. The laser light R emitted from a laser oscillator 32 is focused on the cantilever 26 by a lens 33. The cladding 22 illuminated by the laser light R is greater in heat absorbing amount than the cladding 22 on the opposite side. Due to this, the cantilever 26 is bent in a direction impinged upon with the laser light R by a surface tension of softened oxide silicon. The bending should be in a range of 10 degrees to 90 degrees. The adjustment in a radius of curvature is performed by a laser light R spot size. In this case, there is no necessity of forming polyimide 30 as used in the optical waveguide probes of the above Embodiment 9–12.

[Embodiment 14]

Figure 20:
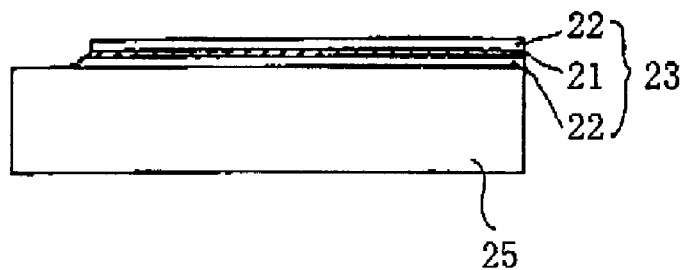
FIG. 20 is an explanatory view showing a manufacturing process for an optical waveguide probe according to Embodiment 14 of the present invention.

FIG. 20 is an explanatory view showing a method for manufacturing an optical waveguide probe according to Embodiment 14 of this invention. In the optical waveguide probe according to this Embodiment 14, a pattern for an optical waveguide 23 is formed by isotropic etching and simultaneously the cantilever 26 at its tip is formed into a sharp form. In patterning, wet etching with a hydrogen fluoride solution or dry etching is used for example. Also, patterning may be made by reactive ion etching with a mask of a metal such as Al, Cr or WSi or photo resist. In this optical waveguide probe, the cladding 22 on the substrate 25 side is formed thin. The thickness of the same cladding 22 is preferably at approximately 0.1 μm.

Figure 21:
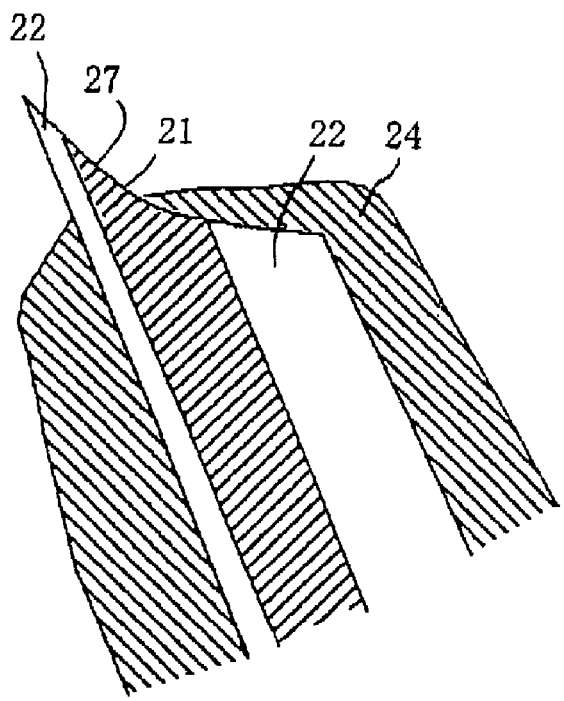
FIG. 21 is a magnified view of a tip portion of a completed cantilever 26 according to the present invention.

In the manufacturing process for this optical waveguide probe, a cladding 22, a core 21 and a cladding 22 are formed in the order through the processes of the step S1101–step S1104 in Embodiment 9. Next, isotropic etching is used in the process of the step S1105. By this process, the optical waveguide 23 at its tip is sharpened on the substrate 25'. Subsequently, performed are the processes of step S1106–step S1108 (FIG. 11A) or the processes of step S11061–step S1107 (FIG. 11B). In this case, the step S1109 (sharpening process) of Embodiment 9 is unnecessary and omitted. Finally, a light reflective layer 24 is formed around the optical waveguide 23. There is shown in FIG. 21 a magnified view of a completed cantilever 26 tip portion.

In this manner, the cladding 22 and core 21 sharpened by the isotropic etching are exposed from the light reflective layer 24, thus forming an aperture 27. This reduces the manufacturing process as compared to the optical waveguide probe of Embodiment 9, providing improvement in yield and shape stabilization. Incidentally, the bending process (step S1108) can use a technique of Embodiment 13. In this case, it is possible to omit the polyimide forming process. Also, the techniques of Embodiments 11 and 12 may be appropriately used.

[Embodiment 15]

FIG. 22 is an explanatory view showing a method for manufacturing an optical waveguide probe according to Embodiment 15 of this invention. In the optical waveguide probe of this Embodiment 15, an optical waveguide 23 pattern is formed by anisotropic etching and simultaneously the cantilever 26 at its tip is formed in a sharp form.

In the manufacturing process for this optical waveguide probe, a cladding 22, a core 21 and a cladding 22 are first formed in the order in the processes of the step S1101–step S1104 of Embodiment 9. Incidentally, the cladding 22 to be formed on an upper surface of the core 21 is formed thin. The thickness of this cladding 22 is preferably at approximately 0.1 μm. Next, the step S1105 uses anisotropic etching. In this process, first the substrate is tilted by a predetermined angle (e.g. 45 degrees). In this state, etching is conducted to sharpen the tip of the optical waveguide 23. Also, simultaneously with this, a pattern for an optical waveguide 23 is formed. The mask material for etching uses amorphous silicon, polysilicon, single crystal silicon, metal such as Al, Cr or WSi or photo resist. Etching uses dry etching with high anisotropy For example, reactive ion etching, induction coupling plasma etching or the like is used.

Subsequently, performed are the processes of step S1106–step S1108 (FIG. 11A) or the processes of step S11061–step S1107 (FIG. 11B). In this case, the step S1109 in Embodiment 9 (sharpening process) is not necessary and omitted. Finally, a light reflective layer 24 is formed around the optical waveguide 23. FIG. 23 shows a magnified view of a completed cantilever 26 tip portion.

In this manner, the cladding 22 and core 21 sharpened by the anisotropic etching are exposed from the light reflective layer 24, thus forming an aperture 27. This reduces the manufacturing process as compared to the optical waveguide probe of Embodiment 9, providing improvement in yield and shape stabilization. Incidentally, the bending process (step S1108) can use a technique of Embodiment 13. In this case, it is possible to omit the polyimide forming process. Also, the techniques of Embodiments 11 and 12 may be appropriately used.

[Embodiment 16]

Figure 24:
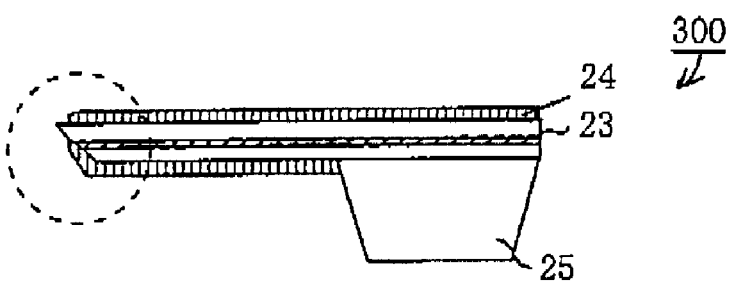
FIG. 24 is an explanatory view showing an optical waveguide probe according to Embodiment 16 of the present invention.

FIG. 24 shows an explanatory view showing an optical waveguide probe according to Embodiment 16 of this invention. This optical waveguide probe 300 has, in Embodiment 15, an optical waveguide layer 24 formed around the optical waveguide 23 without bending the optical waveguide 23 sharpened by anisotropical etching.

Figure 25:
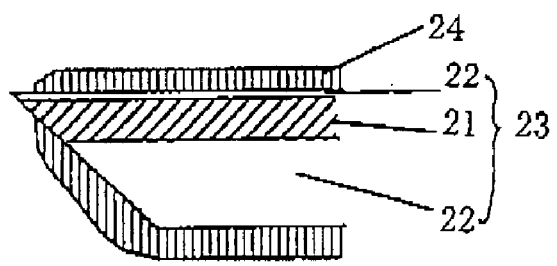
FIG. 25 is a magnified view showing a tip portion of the optical waveguide probe shown in FIG. 24.

The manufacturing process for this optical waveguide probe 300 is same as in Embodiment 15 excepting that the polyimide forming process (step S1106) and the bending process (step S1108) are omitted from Embodiment 15 (FIG. 11A) or the silicon nitride forming process (step S11061) is omitted from Embodiment 15 (FIG. 11B). The tip of this optical waveguide probe 300 is sharpened by anisotropic etching as shown in a magnified view of FIG. 25 so that a sample surface can be measured by largely tilting with respect to a sample or vertically placement. Incidentally, sharpening may be made using isotropic etching in Embodiment 14.

[Embodiment 17]

Figure 26:
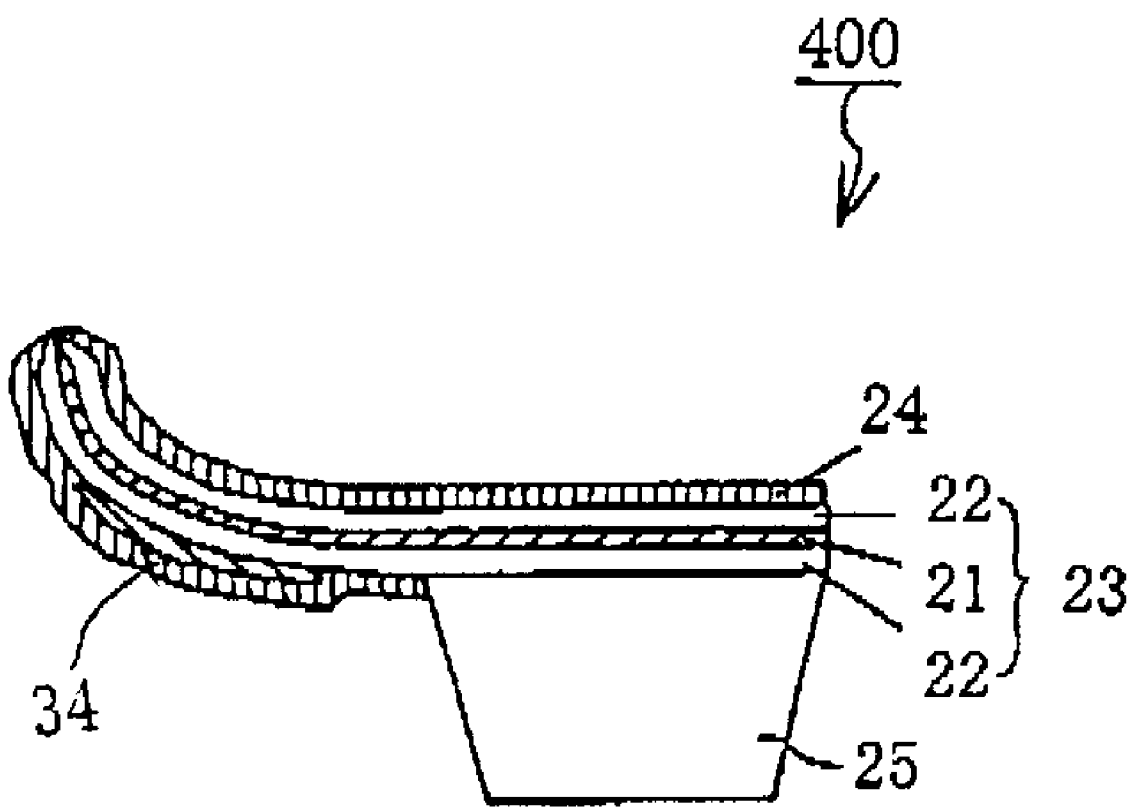
FIG. 26 is an explanatory view showing a structure of an optical waveguide probe according to Embodiment 17 of the present invention.

FIG. 26 is an explanatory view showing an optical waveguide probe structure according to Embodiment 17 of this invention. This optical waveguide probe 400 has a dielectric material 34 formed at an underside of the cantilever 26 so that the cantilever 26 is bent by utilizing a thermal coefficient of expansion thereof. The dielectric material 34 uses silicon oxide doped, for example, with fluorine, boron or phosphorus. The dielectric material 34 has a thermal coefficient of expansion smaller than that of the overall optical waveguide 23. As a result, bending stresses are applied to the cantilever 26 so that the cantilever 26 is bent toward the opposite side to the substrate 25. Incidentally, the cantilever 26 may be formed with grooves 31 as described in the above Embodiment 12.

[Embodiment 18]

Figure 27:
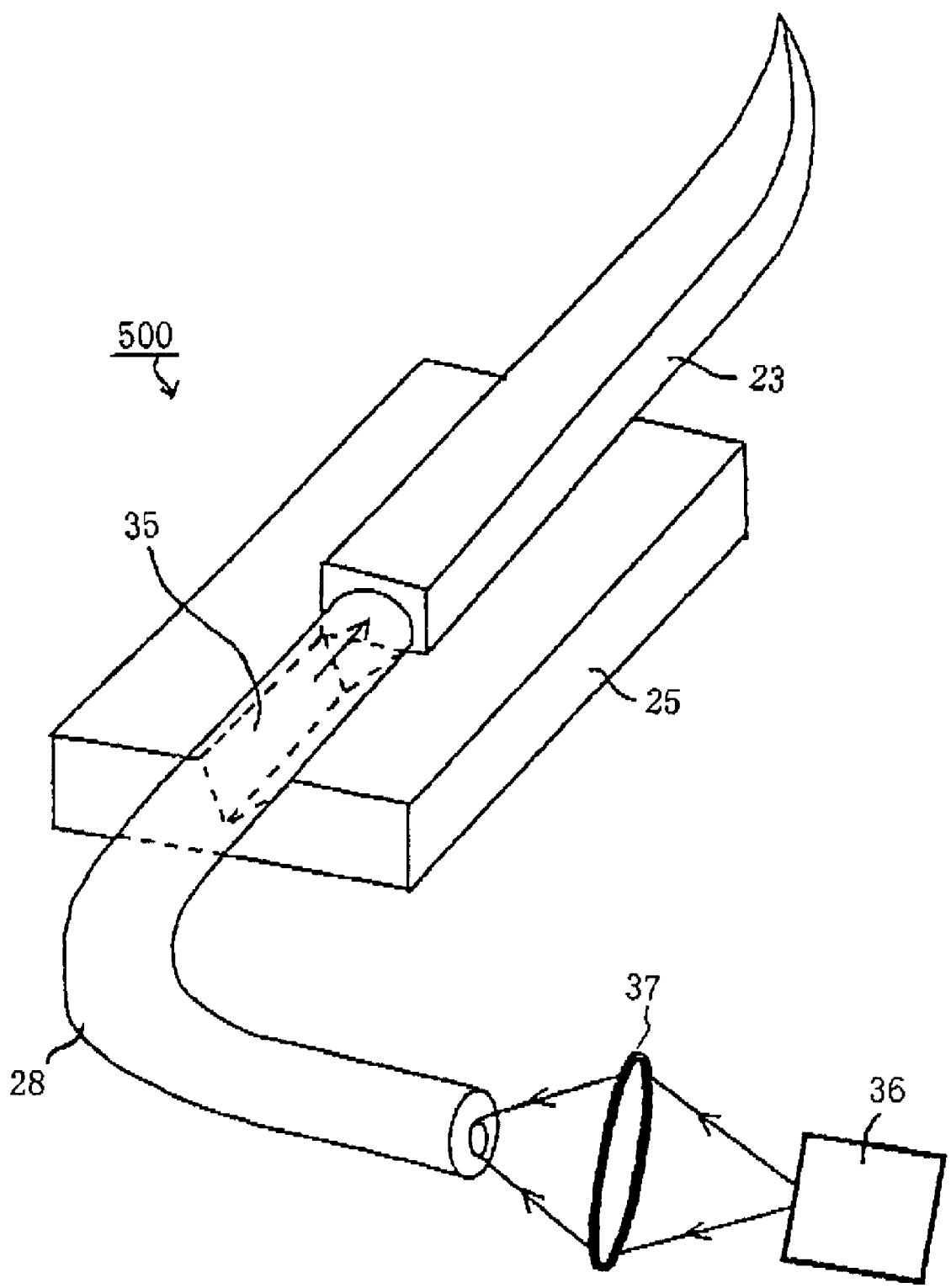
FIG. 27 is a schematic explanatory view showing an optical waveguide probe according to Embodiment 18 of the present invention.

FIG. 27 is a schematic explanatory view of an optical waveguide probe according to Embodiment 18 of this invention. This optical waveguide probe 500 is characterized by providing a groove 35 in the substrate 25 in order to facilitate coupling between the optical waveguide 23 and the optical fiber 28. The other structures are same as in the above Embodiment.

A groove 35 in a V-character form is formed on the substrate 25 in a manner matched to a diameter of the optical fiber 28. The substrate 25 is somewhat elongate in order to form a groove 35. The groove 35 is formed using an anisotropic wet etching method or a dry etching method with anisotropy. For example, it is possible for an anisotropic etching using TMAH to form a V-character formed groove 35 having a certain angle by utilizing an etch rate difference of crystalline surfaces. The optical fiber 28 is positioned by two slant surfaces of the groove 35. An adhesive which is to be set by UV ray radiation is used to fix the optical fiber 28. Incidentally, other adhesives than this may be used. The optical fiber 28 at its end may be closely contacted with an end of the optical waveguide 23 in a state that the optical fiber 28 is in a fixed state.

The light from a light source 36 is focused on one surface of the optical fiber 28 by a lens 37. The light introduced into the optical fiber 28 passes through an inside of the optical fiber 28, reaching the other end surface. The light emitted from the end surface of the optical fiber 28 enters into the optical waveguide 23.

If the optical fiber 28 is positioned in position by providing a groove 35 in the substrate 25 as above, the alignment of the optical fiber 28 with the optical waveguide 23 is easy in coupling therebetween. Incidentally, the shape of the groove 35 may be in a U-character form or recess form without limited to the V-character form.

[Embodiment 19]

Figure 28:
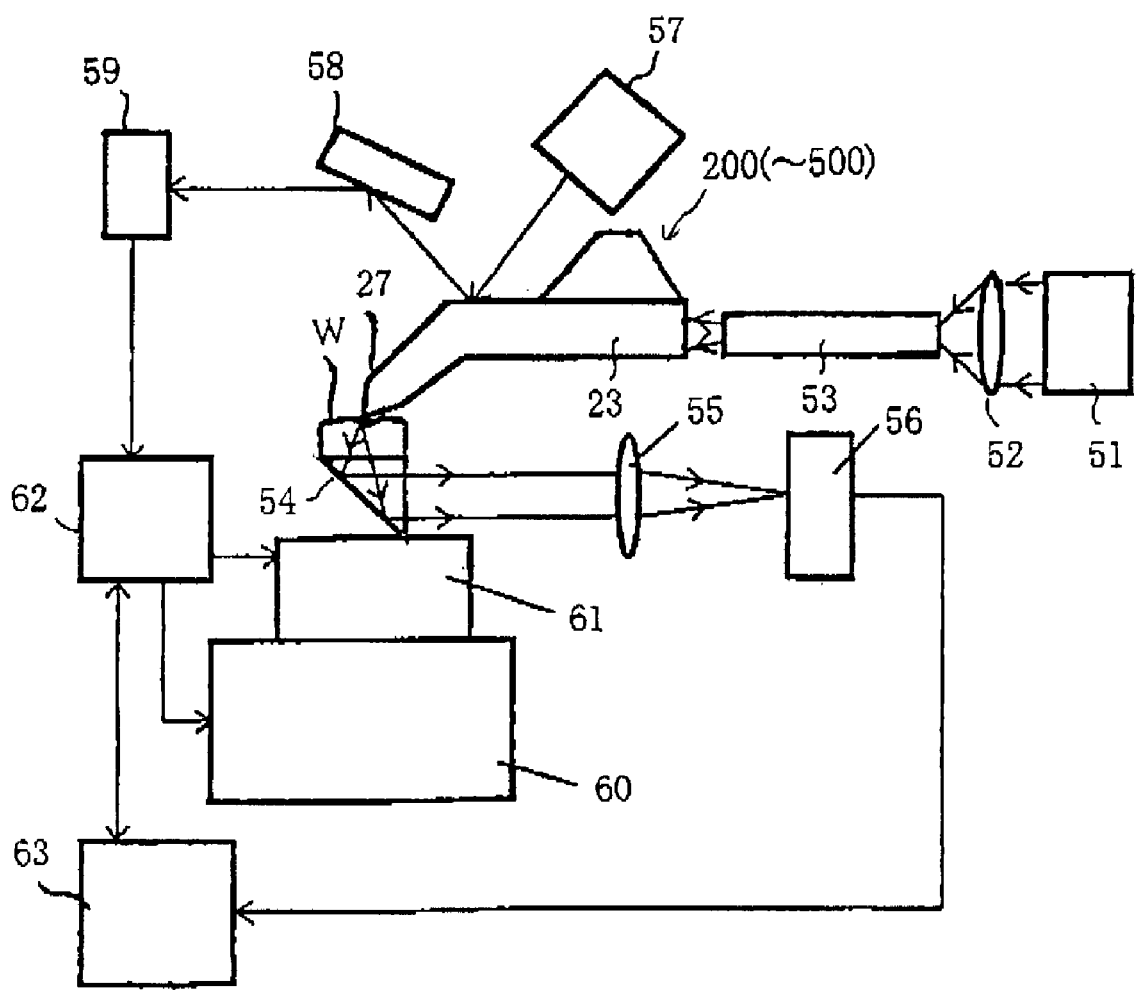
FIG. 28 is a structural view showing a scanning probe microscope according to Embodiment 19 of the present invention.

FIG. 28 is a structural view showing a scanning probe microscope according to Embodiment 19 of this invention. This scanning probe microscope 1000 is provided with an optical waveguide probe 200 (–500), a light source 51 for optical information measurement, a lens 52 placed in front of the light source 51, an optical fiber 53 for transmitting the light collected by the lens 52 to the optical waveguide probe, a prism 54 for reflecting the propagation light caused at a tip of the optical waveguide probe placed under a sample W, a lens 55 for focusing the reflected propagation light reflected by the prism 54, and a photo detector section 56 for receiving the focused propagation light, which were shown in Embodiment 9 to Embodiment 15 and Embodiment 17 and Embodiment 18.

Also, there are provided, above the optical waveguide probe 200, a laser oscillator 57 for outputting laser light, a mirror 58 for reflecting the laser light reflected upon the optical waveguide probe 200, and a vertically two-divided photoelectric converting section 59 for receiving and photoelectrically converting the reflected laser light. Further, there are provided a rough movement mechanism 60 and fine movement mechanism 61 for moving and controlling the sample w and the prism 54 in XYZ directions, a servo mechanism 62 for driving these rough movement mechanism 60 and fine movement mechanism 61, and a computer 63 for controlling the overall apparatus. This scanning probe microscope 1000 is suited for measurement in a dynamic mode or contact mode.

Explanation is then made on the operation of this scanning probe microscope 1000. The laser light emitted from the laser oscillator 57 is reflected upon the optical waveguide probe 200. The optical waveguide probe 200 is displaced by an attractive or repelling force to or from the sample W. Due to this, the reflected laser light deflects which is detected by the photoelectric converting section 59.

The signal detected by the photoelectric converting section 59 is sent to the servo mechanism 62. The servo mechanism 62 controls the rough movement mechanism 60 and fine movement mechanism 61 based on a transmission signal such that the optical waveguide probe 200 approaches the sample W and that the deflection of the optical waveguide probe does not exceed a specified value during observing the surface. The computer 63 receives information on surface geometry from the control signal of the servo mechanism 62.

Also, the light emitted from the light source 51 is focused by the lens 52 to reach the optical fiber 53. The light passed through the inside of the optical fiber 53 is introduced into the optical waveguide 23 and illuminated through its aperture 27 onto the sample W. On the other hand, the optical information about the sample W totally reflected by the prism 54 is focused by the lens 55 and introduced into the light detecting section 56. The signal of the light detecting section 56 is acquired through an analog input interface of the computer 63 whereby it is detected as optical information by the computer 63.

[Embodiment 20]

Figure 29:
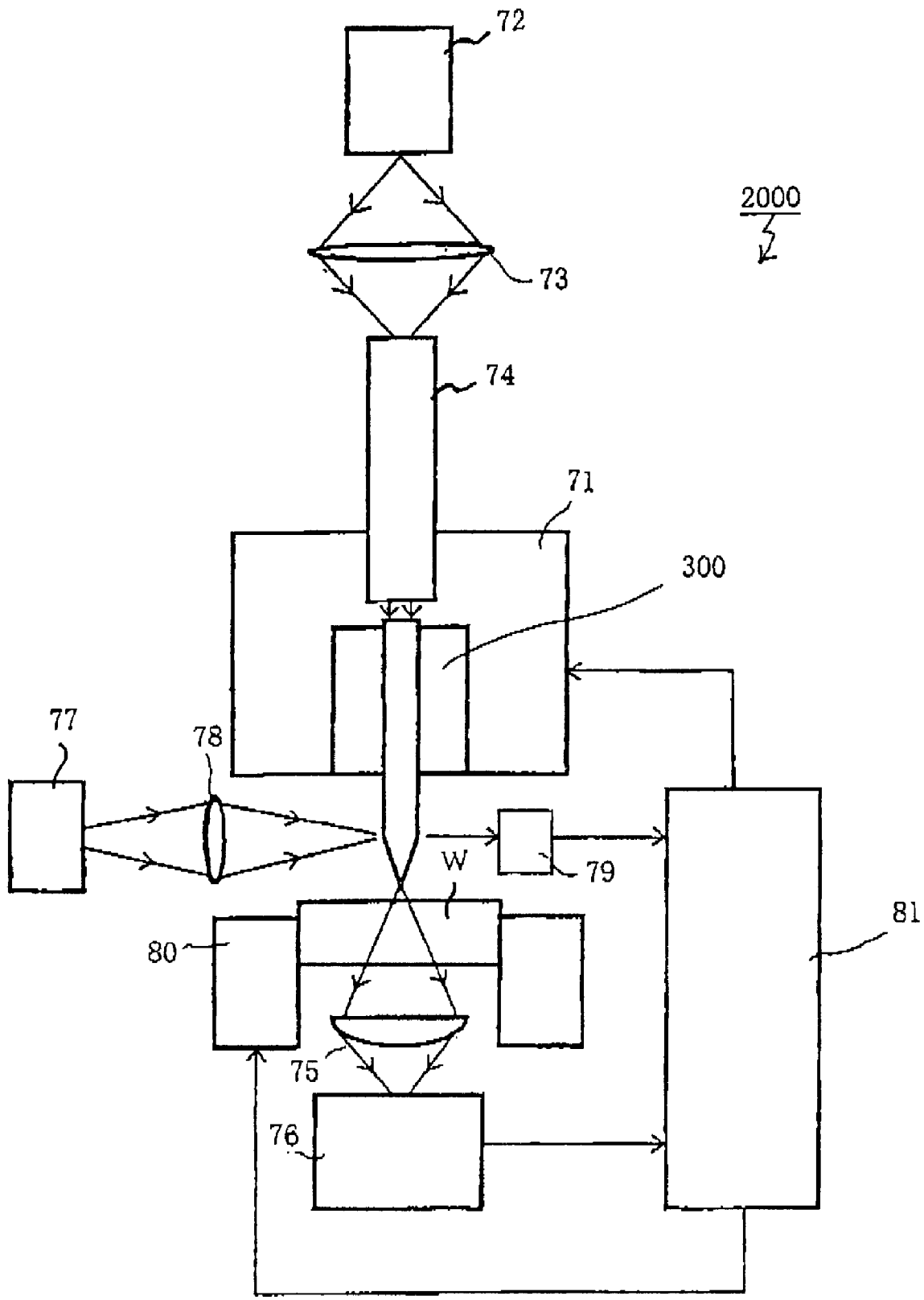
FIG. 29 is a structural view showing a scanning probe microscope according to Embodiment 20 of the present invention.

FIG. 29 is a structural view showing a scanning probe microscope according to Embodiment 20 of this invention. This scanning probe microscope 2000 is provided with an optical waveguide probe 300 shown in Embodiment 16 and Embodiment 18, an excitation means 71 for holding the optical waveguide probe 300, a light source 72 for optical information measurement, a lens 73 placed in front of the light source 72, an optical fiber 74 for propagating the light focused by the lens 73 to the optical waveguide probe 300, a lens 75 placed under the sample W to focus the propagation light caused at the tip of the optical waveguide probe 300, and a light detecting section 76 for receiving the focused propagation light.

Further, there are also provided, on a lateral side of the optical waveguide probe 300, a laser oscillator 77 for outputting laser light, a lens 78 for focusing laser light, and a photoelectric converting section 79 for receiving and photoelectrically converting the laser light. Further, provided are a scanning means 80 for holing a sample, and a control means 81 for controlling the overall apparatus. This scanning probe microscope 2000 is suited for measurement in a sure force mode.

The light emitted from the laser oscillator 77 is focused by the lens 78 onto the optical waveguide probe resonant-vibrated by the excitation means 71. The projection light of the optical waveguide probe is received and photoelectrically converted by the photoelectric converting section 79. The information from the photoelectric converting section 79 is conveyed to the control means 81. The control means 81 controls the scanning means 80 based on the information to maintain constant the spacing between a tip of the optical waveguide probe and a sample surface.

On the other hand, the light emitted from the light source 72 is focused on an end face of the optical fiber 74 by the lens 73. Subsequently, the light passed through the inside of the optical fiber 74 is introduced into the optical waveguide 23 of the optical waveguide probe, and then illuminated through the aperture 27 thereof to the sample W. This optical information is collected by the lens 75 and detected by the light detecting section 76. From the above it is possible to detect change in near field optical characteristic due to XY scanning. Also, the resonant characteristic of the optical waveguide probe 300 is varied by an atomic force acting between the optical waveguide probe 300 tip and the sample surface. If this variation is detected as an electric characteristic change by the control means 81, the sample surface can be observed in geometry by XYZ scanning.

[Embodiment 21]

Figure 30:
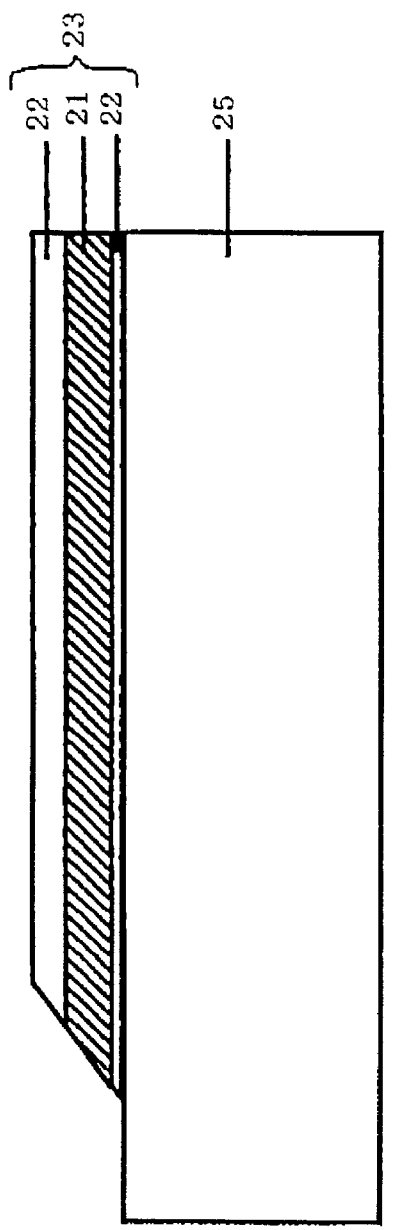
FIG. 30 is an explanatory view showing a manufacturing process for an optical waveguide probe according to Embodiment 21 of the present invention.

FIG. 30 is an explanatory view showing a manufacturing method for an optical waveguide probe according to Embodiment 21 of this invention. For the optical waveguide probe according to this Embodiment 21, a pattern for an optical waveguide 23 is made by anisotropic etching and simultaneously the optical waveguide 23 at its tip is made to a sharp form. In patterning, dry etching with anisotropy is used that typically includes reactive ion etching (RIE). For a mask, a metal such as Al, Cr or WSi, or photo resist or polysilicon or amorphous silicon is used. For this optical waveguide probe, the cladding 22 on the substrate 25 side is formed thin. The thickness of the same cladding 22 is preferably at approximately 0.1 μm.

Figure 31:
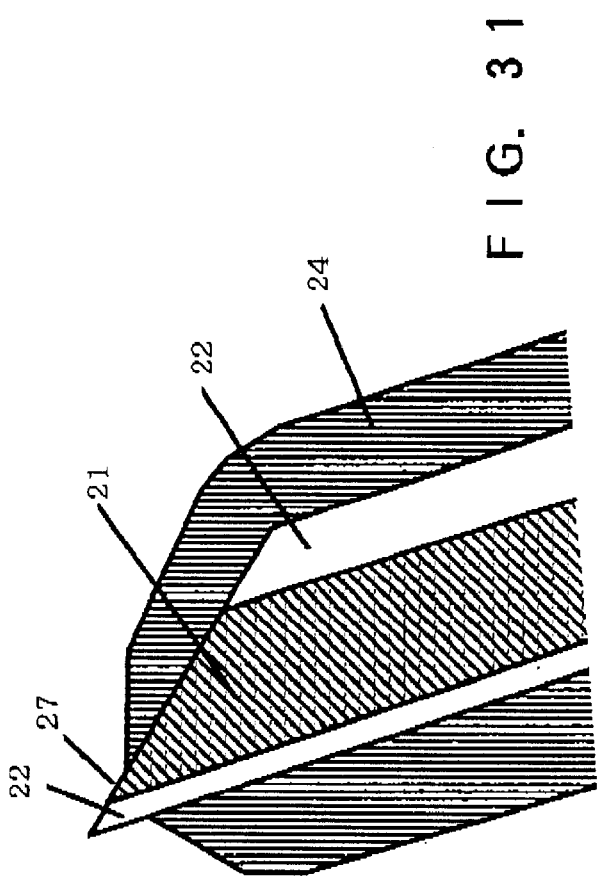
FIG. 31 is a magnified view of a tip portion of the optical waveguide probe according to Embodiment 21 of the present invention.

In a manufacturing process for this optical waveguide probe, a cladding 22, a core 21 and a cladding 22 are first formed in order by the process of the step S1101–step S1104 in Embodiment 9. Next, anisotropic etching is used in a process of the step S1105. By this process the tip of the optical waveguide 23 is sharpened on the substrate 251. Subsequently, performed is a process of the step S1106–step S1108 (FIG. 11A) or a process of the step S11061–step S1107 (FIG. 11B). In this case, the step S1109 (sharpening process) in Embodiment 9 is unnecessity and omitted. Finally, a light reflective layer 24 is formed on a periphery of the optical waveguide 23. FIG. 31 shows a magnified view of a tip portion of a completed cantilever 26.

In this manner, the cladding 22 and core 21 sharpened by anisotropic etching are exposed from the light reflective layer 24, forming an aperture 27. By doing so, the manufacturing process is reduced as compared to the optical waveguide probe of Embodiment 9 thus improving the yield and stabilizing the shape. Incidentally, the technique of Embodiment 13 can be used for the bending process (step S1108). In this case, the polyimide forming process can be omitted. Also, the techniques of Embodiments 11 and 12 may be utilized appropriately.

[Embodiment 22]

Figure 32:
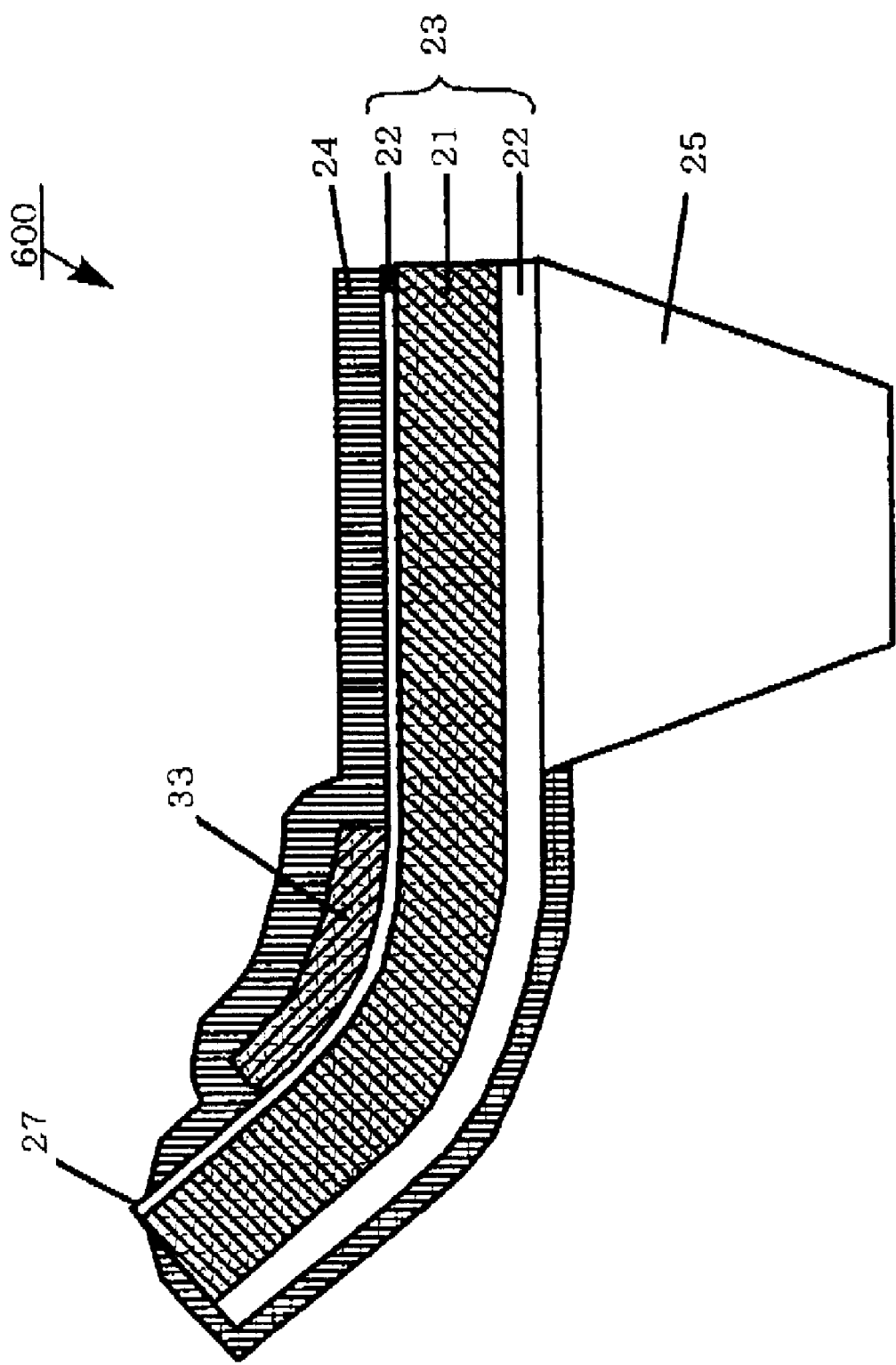
FIG. 32 is an explanatory view showing an optical waveguide probe according to Embodiment 22 of the present invention.

FIG. 32 is an explanatory view showing an optical waveguide probe according to Embodiment 22 of this invention.

In this optical waveguide probe 600, an optical waveguide 23 is vertically etched with respect to the substrate 25 by anisotropic dry etching typically including reactive ion etching (RIE). An optical waveguide 23 of an aperture 27 removed of a light reflective film 24 as at least two sets of surfaces is formed by vertical three surfaces. The optical waveguide 23 is bent by an effect of stresses due to polyimide 30.

In a manufacturing method for this optical waveguide probe 600, a cladding 22, a core 21 and a cladding 22 are first formed in order by the process of the step S1101–step S1104 in Embodiment 9. The thickness of the cladding 22 positioned opposite to the substrate 25 is preferably at approximately 0.05 μm–0.2 μm. Next, in the process of the step S1105 an optical waveguide 23 is vertically etched with respect to the substrate 25 by using anisotropic dry etching. In this process, the tip of the optical waveguide 23 to be formed into an aperture 27 is formed by three surfaces with two sets of vertical surfaces. For example, when amorphous silicon is used as a mask, the amorphous silicon mask as viewed from above the substrate is made in triangular form to vertically etch the tip of the optical waveguide 23 by RIE. The tip is made by a top surface of the cladding 22 and two vertical surfaces to the cladding 22 corresponding to two slant surfaces of the amorphous silicon triangular form as a mask. Subsequently, performed is a process of the step S1106–step S1108 (FIG. 11A) or a process of the step S1106–step S1107 (FIG. 11B). In this case, the step S1109 (sharpening process) in Embodiment 9 is unnecessity and omitted. Finally, a light reflective layer 24 is formed on a periphery of the optical waveguide 23.

In a scanning near field optical microscope, the isotropic placement of an optical waveguide tip having an atomic force with a sample with respect to a sample surface is preferred because a measurement result can be obtained not dependent upon a shape of the tip. In the case of an optical fiber probe, the tip shape is in a sharp form so that the isotropic placement with respect to a sample requires probe bending nearly rectangularly. If the bending angle is large, light loss increases at a bent portion of the optical waveguide 23 to lower the transmission efficiency of light propagating through the inside of the optical waveguide 23. On the other hand, in the case of the optical waveguide probe 600 shown in FIG. 32, as shown in FIG. 32 the optical waveguide 23 tip as an aperture for the optical waveguide probe 600 is rectangular in form as viewed from the side. To isotropically place the tip with respect to a sample satisfactorily requires a bending of the optical waveguide of approximately 45 degrees. That is, the optical waveguide probe 600 is smaller in optical waveguide bending angle as compared to that of the optical fiber probe. This reduces the light loss at the bent portion of the optical waveguide 23 and increases the transmission efficiency of light propagating through the inside of the optical waveguide 23. Also, the small bending angle stabilizes the bending shape in the bending process (step S1108) and improves the yield. Also, the unnecessity of a sharpening process reduces the number of manufacturing processes as compared to the optical waveguide probe of Embodiment 9, further improving the yield.

[Embodiment 23]

Figure 33:
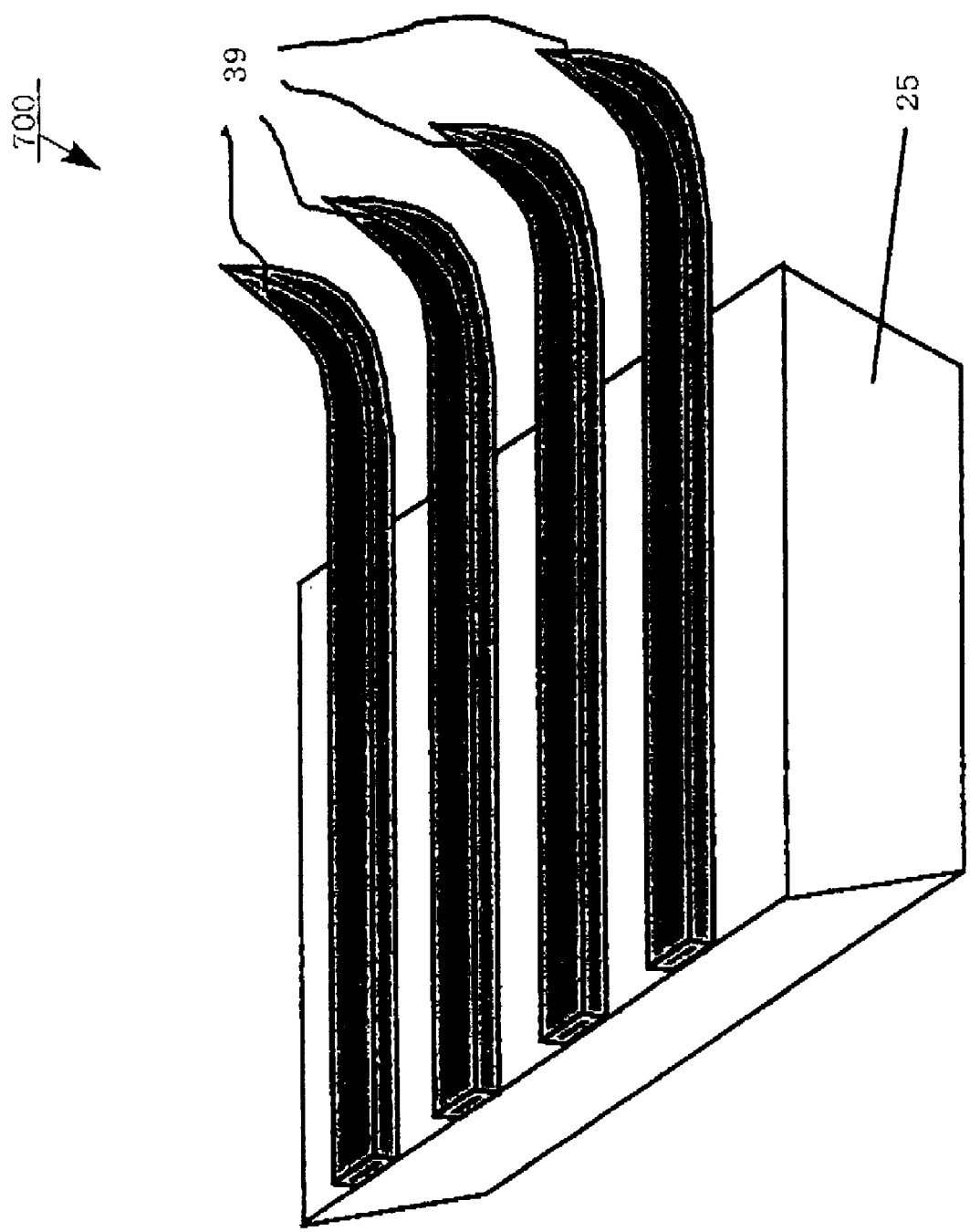
FIG. 33 is an explanatory view showing an optical waveguide probe array according to Embodiment 23 of the present invention.
Figure 34:
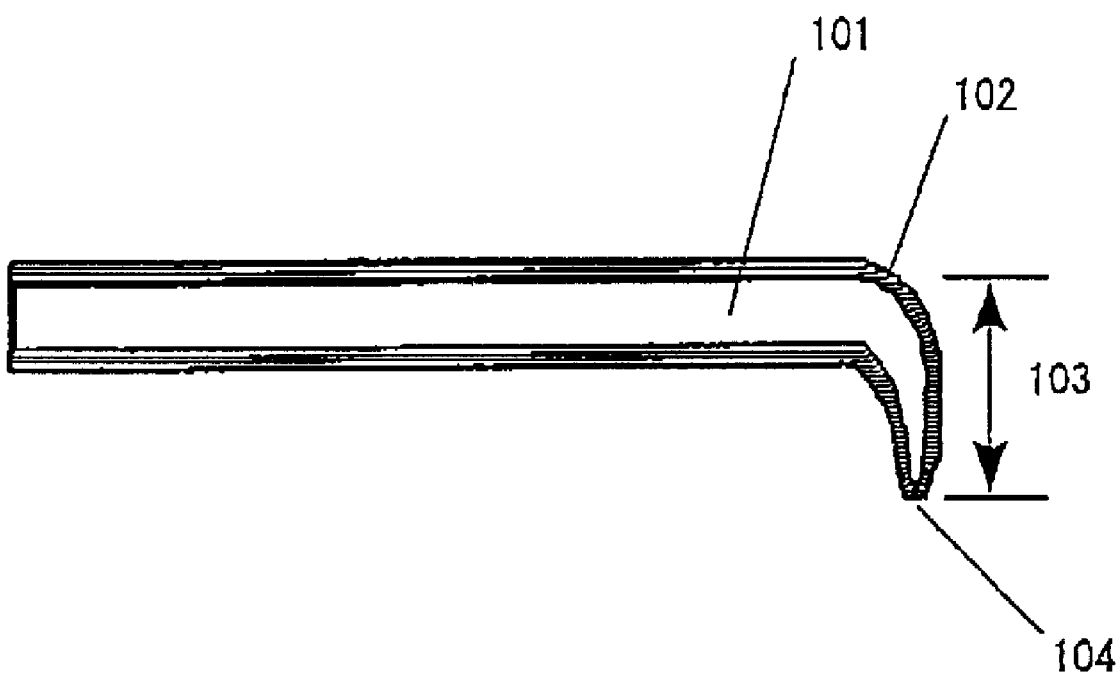
FIG. 34 is a structural view showing an prior art optical waveguide probe.

FIG. 33 is an explanatory view showing an optical waveguide probe array according to Embodiment 23 of this invention.

A plurality of optical waveguides 39 are formed on the substrate 25. All the optical waveguides 39 are bent in an opposite direction to the substrate 25, as shown in FIGS. 33. Also, the optical waveguides 39 may be arranged parallel as sown in FIG. 33, or arranged directed in different directions. In this manner, a variety of combinations are feasible. The use of the optical waveguide probe array 700 structured as this makes it possible to observe on a large area at high speed even it the probe sweep speed is reduced. Also, where the optical waveguide probe array 700 is used as a head array for an optical memory, if the probe aperture is positioned in proximity to a memory medium memorized with information and positioned over a plurality of medium tracks, high-speed light memorization and reproduction is possible without increasing the head speed to a high speed.

Meanwhile, if the optical waveguide probe array 700 is structured with a plurality of kinds of optical waveguides 39 on the substrate 25, it becomes possible to opt an arbitrary optical waveguide 39 in a manner suited for the purpose. The optical waveguide probe array 700 constructed as this is compatible with various applications.

Also, where a plurality of optical waveguides 39 are arranged in a same shape on the substrate 25, even if one optical waveguide is damaged, the other optical waveguides can be selected. Thus, continuous use is possible without exchanging the optical waveguide probe.

Meanwhile, it is possible to use one of a plurality of optical waveguides in an illumination mode to illuminate light through the microscopic aperture creating near field light, and to use another optical waveguide in a collection mode to detect near field light caused on a sample surface by the microscopic aperture. Due to this, for example, the light irradiation onto a sample surface creates near field light on the sample surface. Thus, it is realized on a common substrate to pick up sample-surface near field light propagation light caused through interaction with the microscopic aperture.

INDUSTRIAL APPLICABILITY

As explained above, according to this invention, a lever portion can be made in a short, thin shape as compared to the conventional SNOM optical fiber probe. Because the resonant frequency can be increased without increasing the spring constant, simultaneous measurement is possible for high speed, high accurate and good reproducible shape and optical characteristics. Also, because the optical waveguide portion formed in a hook form can be increased in length, it is easy to measure a sample with a large step. Furthermore, vibration in a liquid is stable due to the rectangular cantilever shape as compared to the conventional AFM cantilever with a flat plate cantilever, which makes possible to carry out simultaneous measurements of high accurate AFM and SNOM in a liquid.

Also, because the optical waveguide portions are laid on the substrate in one body, handling is easier than in the optical fiber probe. In addition, because the manufacturing method is good in mass producibility and shape reproducibility, it is possible to manufacture an optical waveguide probe with even mechanical property at low price.

Also, because a material different in thermal coefficient of expansion from the optical waveguide is formed in the optical waveguide and heated up, the optical waveguide is easy to bend.

Also, the amount of bending in the optical waveguide is reduced by forming the aperture of the optical waveguide with an apex of three surfaces including two surfaces with a rectangular angles, stably obtaining an optical waveguide probe bent form. Also, the light transmission efficiency through the optical waveguide is improved.

Also, an optical waveguide probe array excellent in evenness and shape reproducibility can be manufactured with high mass producibility and at low cost.

Where conducting measurement using this probe array, if one optical waveguide be damaged, another optical waveguide can be used. This makes it possible to perform measurement without exchanging the probe.

Also, if various shapes of probes are arranged on one substrate, measurement is possible by selecting a probe suited for a purpose of the measurement.

Also, if the probe array is utilized as a head array for an optical memory, data reading and writing are possible at high speed. Also, reading and writing can be simultaneously made on a same media. In such a head array, trackingless is possible.

What is claimed is:

1. An optical waveguide probe comprising: an optical waveguide portion; a sharpened tip portion formed at one end of the waveguide portion; and a substrate for supporting the optical waveguide portion; wherein the optical waveguide portion is overlaid on the substrate and formed integrally therewith and the optical waveguide portion has a rectangular cross section.

2. An optical waveguide probe comprising: an optical waveguide portion; a sharpened tip portion formed at one end of the waveguide portion in a hook form; a substrate for supporting the optical waveguide portion; and a metal film covering the optical waveguide portion; wherein the optical waveguide portion is overlaid on the substrate and formed integrally therewith, the tip portion is covered by the metal film except for an aperture formed at an apex thereof, and the optical waveguide portion has a rectangular cross section.

3. An optical waveguide probe according to claim 1 or claim 2; wherein the optical waveguide portion is formed of a dielectric material.

4. An optical waveguide probe according to claim 3; wherein the optical waveguide portion is formed of a dielectric consisting of a single material.

5. An optical waveguide probe according to claim 3; wherein the optical waveguide portion comprises a core for light transmission and a cladding having a smaller refractive index than the core.

6. A method for manufacturing an optical waveguide probe, comprising: a process of forming a mold for embedding an optical waveguide in a substrate; a process of depositing a material in the mold to form the optical waveguide on the substrate; a process of separating the optical waveguide along the mold; and a process of partially separating the optical waveguide probe from the substrate so that the optical waveguide is formed integrally with and supported by the substrate.

7. A method for manufacturing an optical waveguide probe, comprising: a process of forming a mold for embedding an optical waveguide in a substrate; a process of depositing a material in the mold to form the optical waveguide on the substrate in a probe shape; a process of partially separating the optical waveguide probe from the substrate so that the optical waveguide is formed integrally with and supported by the substrate.

8. A method for forming an optical waveguide probe according to claim 6 or claim 7; wherein the process of forming a mold for embedding the optical waveguide is an isotropic dry etching process using, as an etching mask, a photoresist layer having a thickness distribution obtained by exposing the photoresist to light using a photo mask with a graduation.

9. A method for forming an optical waveguide probe according to claim 6 or claim 7; wherein the process of forming a mold for embedding the optical waveguide is an isotropic wet etching process using, as an etching mask, a photoresist layer having a thickness distribution obtained by exposing the photoresist to light using a photo mask with a graduation.

10. A method for forming an optical waveguide probe according to claim 6 or claim 7; wherein the process of forming a mold for embedding the optical waveguide is an anisotropic dry etching process using, as an etching mask, a photoresist layer having a thickness distribution obtained by exposing the photoresist to light using a photo mask with a graduation.

11. A method for forming an optical waveguide probe according to claim 6 or claim 7; wherein the process of forming a mold for embedding the optical waveguide is an isotropic dry etching process utilizing etching undercut to etch underneath an etching mask material formed on the substrate.

12. A method for forming an optical waveguide probe according to claim 6 or claim 7; wherein the process of forming a mold for embedding the optical waveguide is an isotropic wet etching process utilizing etching undercut to etch underneath an etching mask material formed on the substrate.

13. A method for forming an optical waveguide probe according to claim 6 or claim 7; wherein the process of forming a mold for embedding the optical waveguide is a multi-staged anisotropic wet etching process performed on the substrate by using an etching mask having at least two steps.

14. A method for forming an optical waveguide probe according to claim 6 or claim 7; wherein the process of forming a mold for embedding the optical waveguide is an anisotropic wet etching process performed on the substrate.

15. A method for forming an optical waveguide probe according to claim 6; wherein the mold for embedding the optical waveguide has a boat shape having a bottom, sidewalls and a tapered front portion, and the process of depositing a material to the optical waveguide is performed so that the material is deposited in the boat-shaped mold.

16. A method for forming an optical waveguide probe according to claim 7; wherein the mold for embedding the optical waveguide has a stepped profile having two parallel flat surfaces and a slant surface connecting the parallel flat surfaces, and the slant surface comprises one or more flat planes or a curved surface.

17. A method for forming an optical waveguide probe according to claim 16; wherein the slant surface is a curved surface.

18. A method for forming an optical waveguide probe according to claim 6 or claim 7; wherein the process of depositing the optical waveguide in the mold comprises the steps of depositing a dielectric material layer as a first cladding layer of the optical waveguide, depositing a dielectric material having a larger refractive index than the first cladding layer as a core of the optical waveguide, patterning the core, and further depositing a dielectric material layer as a second cladding layer of the optical waveguide so that the core is surrounded by the first and second cladding layers.

19. A method for forming an optical waveguide probe according to claim 18; wherein the core is patterned by photolithography using electro-deposition resist.

20. A method for forming an optical waveguide probe according to claim 6; wherein the process of partially separating the optical waveguide along the mold comprises the steps of depositing a dielectric material in the mold, planarizing by embedding a resin material in a recess formed in a portion of the mold, and separating the optical waveguide by polishing the substrate surface.

21. A method for forming an optical waveguide probe according to claim 7; wherein the process of patterning the optical waveguide into a probe shape is a photolithography process using electro-deposition resist.

22. A method for forming an optical waveguide probe according to claim 7; wherein the process of separating the optical waveguide probe from the substrate is a dry etching process performed from a surface of the substrate opposite a surface on which the optical waveguide is formed.

23. A method for forming an optical waveguide probe according to claim 6 or claim 7; wherein the process of separating the optical waveguide probe from the substrate is a wet etching process performed from a surface of the substrate opposite a surface on which the optical waveguide is formed.

24. An optical waveguide probe, comprising: a substrate as a support member; a columnar optical waveguide having a rectangular cross section formed on and supported by the substrate and having a resilient portion projecting from the substrate and being bent away from the substrate in a direction toward a sample or a medium to be inspected, and a sharpened tip at a terminal portion of the resilient portion; and a light reflective layer formed over said optical waveguide except for an aperture formed at the sharpened tip.

25. An optical waveguide probe according to claim 24; wherein the optical waveguide has a core for transmitting light and a cladding surrounding at least a portion of the core.

26. An optical waveguide probe, comprising: a substrate as a support member; a columnar optical waveguide having a rectangular cross section formed on and supported by the substrate and having a resilient portion projecting from the substrate and having a sharpened tip at an apex thereof; and a light reflective layer formed over the optical waveguide except for an aperture formed at the sharpened tip.

27. An optical waveguide probe according to any one of claims 24 to 26; wherein the aperture of the optical waveguide is formed by three surfaces.

28. An optical waveguide probe according to any one of claims 24 to 26; wherein the aperture of the optical waveguide is formed by three surfaces including at least two generally vertical surfaces.

29. An optical waveguide probe according to any one of claims 24 to 26; wherein the optical waveguide has a first surface that is generally vertical with respect to a surface of the substrate in contact with the optical waveguide and a second surface that is generally horizontal with respect to a surface of the support substrate in contact with the optical waveguide.

30. An optical waveguide probe according to any one of claims 24 to 26; wherein the resilient portion of the optical waveguide projecting from the substrate has a groove formed therein.

31. An optical waveguide probe according to any one of claims 24 to 26; wherein a groove is formed in the substrate serving as a connection position of the optical waveguide and an optical fiber.

32. An optical waveguide probe according to any one of claims 24 to 26; further comprising one or more additional ones of the columnar optical waveguides formed on the substrate.

33. In a process for manufacturing an optical waveguide probe comprising a substrate serving as a support member, a columnar optical waveguide formed on the substrate and having a resilient portion projecting from the substrate, the resilient portion being bent away from the substrate and toward a sample or a medium to be inspected and having a sharpened tip at a terminal end thereof, and a light reflective layer formed over the optical waveguide except for an aperture at the tip, a method for bending the optical waveguide comprising the steps of:

overlaying a material having a different thermal coefficient of expansion from the material forming the optical waveguide on one surface of the resilient portion of the optical waveguide projecting from the substrate; and heating the material and the optical waveguide to cause the optical waveguide to bend.

34. In a method for manufacturing an optical waveguide probe having an optical waveguide overlaid on a substrate such that a portion thereof projects from the substrate, a tip of the projecting portion of the optical waveguide is sharpened, and a light reflective layer is formed over the optical waveguide except for an aperture at the tip, a method for bending the resilient portion such that the tip extends away from the substrate, comprising:

a process of forming a material having a different thermal coefficient of expansion than a material forming the optical waveguide on one surface of the optical waveguide; and a process of heating the material and the optical waveguide to bend the optical waveguide.

35. In a process of manufacturing an optical waveguide probe comprising a substrate serving as a support member, a columnar optical waveguide formed on the substrate and having a resilient portion projecting from the substrate, the resilient portion being bent away from the substrate and toward a sample or a medium to be inspected and having a sharpened tip, and a light reflective layer formed over the optical waveguide except for an aperture at the tip, a method for bending the optical waveguide comprising the steps of:

heating the optical waveguide probe;

while heating the optical waveguide probe, patterning the substrate to support the optical waveguide; and while heating the optical waveguide probe, depositing a material having a different thermal coefficient of expansion from the material forming the optical waveguide on one surface of the resilient portion of the optical waveguide projecting from the substrate.

36. In a method for manufacturing an optical waveguide probe comprising an optical waveguide overlaid on a substrate such that one part of the optical waveguide probe projects from the substrate and has tip that is sharpened, and a light reflective layer formed over the optical waveguide except for an aperture formed at the tip, the steps of:

heating the optical waveguide probe; and during heating of the optical waveguide probe, forming a material having a different thermal coefficient of expansion from the material forming the optical waveguide on one surface of the optical waveguide.

37. A method for manufacturing an optical waveguide probe according to any one of claims 33 to 36; further comprising the step of depositing a material having a different thermal coefficient of expansion from the material forming the optical waveguide on one surface of the optical waveguide or on a surface of the optical waveguide formed into a cantilever.

38. In a method for manufacturing an optical waveguide probe comprising an optical waveguide overlaid on a substrate such that a resilient portion of the optical waveguide projects from the substrate and terminates in a tip that is sharpened, and a light reflective layer formed over the optical waveguide except for an aperture at the tip, the step of:

bending the optical waveguide by heating a surface of the optical waveguide.

39. A method for manufacturing an optical waveguide probe according to any one of claims 32 to 36 or 38; further comprising the step of forming a groove in the optical waveguide.

40. A method for manufacturing an optical waveguide probe comprising the steps of:

providing a substrate;

forming a columnar optical waveguide having a rectangular cross section on the substrate such that a resilient portion of the optical waveguide projects from the substrate and terminates in a tip that is sharpened; and forming a light reflective layer over the optical waveguide except for an aperture at the tip.

41. A method for manufacturing an optical waveguide probe according to claim 40; wherein the step of forming the optical waveguide includes the step of performing isotropic etching to form the sharpened tip.

42. A method for manufacturing an optical waveguide probe according to claim 40; wherein the step of forming the optical waveguide includes the step of performing anisotropic etching to form the sharpened tip.

43. A method for manufacturing an optical waveguide probe according to claim 40; wherein the step of forming the optical waveguide includes the steps of inclining the substrate, and performing anisotropic etching to form the sharpened tip.

44. An optical waveguide probe according to claim 1; further comprising a resilient portion projecting from the substrate and terminating in the tip portion.

45. An optical waveguide probe according to claim 1; wherein the resilient portion is bent in the form of a hook so that the tip portion extends in a direction away from the substrate.

46. An optical waveguide probe according to claim 1; wherein the optical waveguide probe and the tip portion comprise a plurality of films deposited on the substrate and patterned to form the waveguide portion with an elongate structure and the sharpened tip portion.

47. An optical waveguide probe according to claim 1; wherein the optical waveguide portion is formed with a bend so that the sharpened tip portion projects away from the substrate.

48. An optical waveguide probe according to claim 1; wherein the optical waveguide portion comprises a core formed of one or more films deposited on the substrate and a cladding formed of one or more films deposited on the substrate to cover the core, the cladding having a smaller refractive index than the core.

49. An optical waveguide probe assembly comprising: a substrate; and an optical waveguide probe formed on the substrate and comprising a plurality of films deposited on the substrate and patterned to have an elongate waveguide portion and a tip portion.

50. An optical waveguide probe assembly according to claim 49; wherein a portion of the optical waveguide probe including the tip portion projects from the substrate.

51. An optical waveguide probe assembly according to claim 50; wherein the portion of the optical waveguide probe projecting from the substrate is formed with a bend so that the tip portion faces away from the substrate.

52. An optical waveguide probe assembly according to claim 49; further comprising a metal film covering the optical waveguide probe except for an aperture formed at the tip.

53. An optical waveguide probe assembly according to claim 49; wherein the optical waveguide probe is formed of a dielectric material.

54. An optical waveguide probe assembly according to claim 49; wherein the optical waveguide probe comprises a core formed of one or more films deposited on the substrate for transmitting light and a cladding having a smaller refractive index than the core and formed of one or more films deposited on the substrate.

* * * * *